(12) United States Patent
Matsuo et al.

(10) Patent No.: US 11,770,845 B2
(45) Date of Patent: Sep. 26, 2023

(54) RADIO UNIT, AND COMMUNICATION METHOD FOR CONTROLLING TRANSFER AND NON-TRANSFER OF RECEIVED SIGNAL

(71) Applicant: Panasonic Corporation, Osaka (JP)

(72) Inventors: Hidenori Matsuo, Kanagawa (JP); Ryuji Muta, Kanagawa (JP)

(73) Assignee: Panasonic Holdings Corporation, Osaka (JP)

( * ) Notice: Subject to any disclaimer, the term of this patent is extended or adjusted under 35 U.S.C. 154(b) by 105 days.

(21) Appl. No.: 17/220,516

(22) Filed: Apr. 1, 2021

(65) Prior Publication Data

US 2021/0321407 A1 Oct. 14, 2021

(30) Foreign Application Priority Data

Apr. 10, 2020 (JP) .................................. 2020-070991

(51) Int. Cl.
| | |
|---|---|
| *H04W 72/53* | (2023.01) |
| *H04W 72/044* | (2023.01) |
| *H04W 88/08* | (2009.01) |
| *H04L 41/0894* | (2022.01) |
| *H04L 41/40* | (2022.01) |
| *H04L 41/122* | (2022.01) |
| *H04L 45/76* | (2022.01) |

(Continued)

(52) U.S. Cl.
CPC ......... *H04W 72/53* (2023.01); *H04L 41/0894* (2022.05); *H04L 41/0897* (2022.05); *H04L 41/122* (2022.05); *H04L 41/40* (2022.05); *H04L 45/76* (2022.05); *H04W 72/0466* (2013.01); *H04W 72/21* (2023.01); *H04W 72/23* (2023.01); *H04W 88/085* (2013.01)

(58) Field of Classification Search
CPC ......... H04W 72/0493; H04W 72/0413; H04W 72/042; H04W 72/0466; H04W 88/085; H04W 92/20; H04W 92/22; H04W 72/53; H04W 72/23; H04W 72/21; H04L 41/00; H04L 41/08; H04L 41/0894; H04L 41/0896; H04L 41/0897; H04L 41/12; H04L 41/122; H04L 41/342; H04L 41/40; H04L 45/00; H04L 45/76; H04B 1/0003
See application file for complete search history.

(56) References Cited

U.S. PATENT DOCUMENTS

2018/0242349 A1* 8/2018 Noh ...................... H04W 72/56
2019/0075560 A1* 3/2019 Takiguchi ............... H04L 1/188
(Continued)

OTHER PUBLICATIONS

Katranaras et al., "Sum Rate of Linear Cellular Systems with Clustered Joint Processing," Centre for Communication Systems Research CCSR, 2009, 6 pages.
(Continued)

*Primary Examiner* — Oussama Roudani
(74) *Attorney, Agent, or Firm* — Seed IP Law Group LLP

(57) ABSTRACT

A radio unit includes: receiver circuitry which, in operation, receives, from each of a first distributed unit and a second distributed unit that control the radio unit, control information regarding resource allocation for uplink for a terminal; and controller circuitry which, in operation, controls, based on the control information, transfer of a received signal in the uplink to either the first distributed unit or the second distributed unit.

9 Claims, 18 Drawing Sheets

(51) Int. Cl.
*H04L 41/0897* (2022.01)
*H04W 72/21* (2023.01)
*H04W 72/23* (2023.01)

(56) References Cited

U.S. PATENT DOCUMENTS

| | | | |
|---|---|---|---|
| 2020/0044670 A1* | 2/2020 | Beck | H04B 7/04 |
| 2020/0146108 A1* | 5/2020 | Goto | H04W 72/23 |
| 2020/0367062 A1* | 11/2020 | Salahuddeen | H04L 61/5007 |
| 2021/0007039 A1* | 1/2021 | Salahuddeen | H04W 72/005 |
| 2021/0014737 A1* | 1/2021 | Yang | H04W 76/11 |
| 2021/0120531 A1* | 4/2021 | Jeon | H04B 7/0695 |
| 2021/0120538 A1* | 4/2021 | Huh | H04L 5/0023 |
| 2021/0136788 A1* | 5/2021 | Lim | H04W 72/1278 |
| 2021/0243617 A1* | 8/2021 | Cooper | H04W 72/0453 |
| 2021/0306039 A1* | 9/2021 | Vijayan | H04B 1/06 |
| 2021/0321390 A1* | 10/2021 | Muta | H04W 88/085 |
| 2021/0367721 A1* | 11/2021 | Tsukamoto | H04L 5/0005 |
| 2021/0392663 A1* | 12/2021 | Yasukawa | H04L 5/0055 |

OTHER PUBLICATIONS

NGMN Alliance, "NGMN Overview on 5G RAN Functional Decomposition," Feb. 24, 2018, 48 pages.

* cited by examiner

FIG. 10

UL allocation information (LLS DU case)

| DU index | 0 | | | |
|---|---|---|---|---|
| UE ID(RNTI) | 3578 | 3C23 | 3F51 | 4478 |
| Start RB index | 15 | 21 | 18 | 15 |
| No. of Consecutive RBs | 6 | 8 | 8 | 12 |
| Subframe index | 2 | 2 | 7 | 8 |
| Slot index | 0 | 0 | 0 | 0 |
| Start symbol Index | 9 | 9 | 9 | 9 |
| No. of Consecutive symbols | 5 | 5 | 5 | 5 |

UL allocation information (HLS DU case)

| DU index | 2 | |
|---|---|---|
| UE ID(RNTI) | 980 | 2AFF |
| Start RB index | 0 | 0 |
| No. of Consecutive RB | 8 | 10 |
| Subframe index | 7 | 8 |
| Slot index | 0 | 0 |
| Start symbol Index | 9 | 9 |
| No. of Consecutive symbols | 5 | 5 |

FIG. 14

| DU index | 0 | | | |
|---|---|---|---|---|
| PCI (scrambling info) | 1 | | | |
| UE ID(RNTI) | 3578 | 3C23 | 3F51 | 4478 |

UE ID and scrambling information (LLS DU case)

| DU index | 2 |
|---|---|
| PCI (Scrambling info) | 11 |
| UE ID(RNTI) | 980 | 2AFF |

UE ID and scrambling information (HLS DU case)

FIG. 18

PUCCH resource information (LLS DU case)

| DU index | 0 | | | | |
|---|---|---|---|---|---|
| UE ID(RNTI) | 3578 | | | | |
| PUCCH Format | 0 | 1 | 2 | 3 | 4 |
| Start RB index(PRB-Id) | 20 | 20 | 20 | 20 | 20 |
| No. of Consecutive RBs | 1 | 1 | 8 | 12 | 1 |
| Subframe index | 9 | 9 | 8 | 8 | 8 |
| Slot index | 2 | 2 | 4 | 2 | 4 |
| Start symbol Index | 12 | 9 | 11 | 9 | 9 |
| No. of Consecutive symbols | 1 | 4 | 1 | 4 | 4 |

PUCCH resource Information (HLS DU case)

| DU index | 2 | | | | |
|---|---|---|---|---|---|
| UE ID(RNTI) | 980 | | | | |
| PUCCH Format | 0 | 1 | 2 | 3 | 4 |
| Start RB index(PRB-Id) | 5 | 5 | 5 | 5 | 5 |
| No. of Consecutive RBs | 1 | 1 | 8 | 12 | 1 |
| Subframe index | 9 | 9 | 8 | 8 | 8 |
| Slot index | 2 | 2 | 4 | 2 | 4 |
| Start symbol Index | 12 | 9 | 11 | 9 | 9 |
| No. of Consecutive symbols | 1 | 4 | 1 | 4 | 4 |

# RADIO UNIT, AND COMMUNICATION METHOD FOR CONTROLLING TRANSFER AND NON-TRANSFER OF RECEIVED SIGNAL

BACKGROUND

1. Technical Field

The present disclosure relates to a radio unit, a distributed unit, and a communication method.

2. Background Art

In Release 15 of the 3rd Generation Partnership Project (3GPP), which is an international standardization organization, introduction of a new interface (New Radio (NR), for example) and functional modules is studied as an architecture of a radio access network (RAN) for 5th generation mobile communication systems (5G).

For example, a configuration in which functionality of a 5G NR radio base station (also called a base station or a Next-Generation NodeB (gNB), for example) included in a 5G RAN is separated (that is, split) is studied.

SUMMARY

However, uplink (UL) wireless communication methods in a configuration in which functionality of a base station is split have not been studied well.

Non-limiting exemplary embodiments of the present disclosure contribute to providing a radio unit, a distributed unit, and a communication method that are capable of improving the efficiency of wireless communication in UL.

A radio unit according to an exemplary embodiment of the present disclosure includes: receiver circuitry which, in operation, receives, from each of a first distributed unit and a second distributed unit that control the radio unit, control information regarding resource allocation for uplink for a terminal; and controller circuitry which, in operation, controls, based on the control information, transfer of a received signal in the uplink to either the first distributed unit or the second distributed unit.

Note that these comprehensive or specific aspects may be implemented in a system, a device, a method, an integrated circuit, a computer program, or a recording medium, or may be implemented in any combination of a system, a device, a method, an integrated circuit, a computer program, and a recording medium.

According to an exemplary embodiment of the present disclosure, the efficiency of wireless communication in UL can be improved.

Further advantages and effects of exemplary embodiments of the present disclosure will be apparent from the description and drawings. Each of such advantages and/or effects is provided by some exemplary embodiments and features described in the description and drawings; however, all the advantages and/or effects need not be provided in order to obtain one or more identical features.

BRIEF DESCRIPTION OF DRAWINGS

FIG. 10 shows an example of control information, notification of which is given by DU to RU according to the first exemplary embodiment;

FIG. 14 shows an example of control information, notification of which is given by DU to RU according to the second exemplary embodiment;

FIG. 18 shows an example of control information, notification of which is given by DU to RU according to the third exemplary embodiment.

DETAILED DESCRIPTION OF PREFERRED EMBODIMENTS

Individual exemplary embodiments of the present disclosure will now be described in detail with reference to the drawings.

Figure 1:
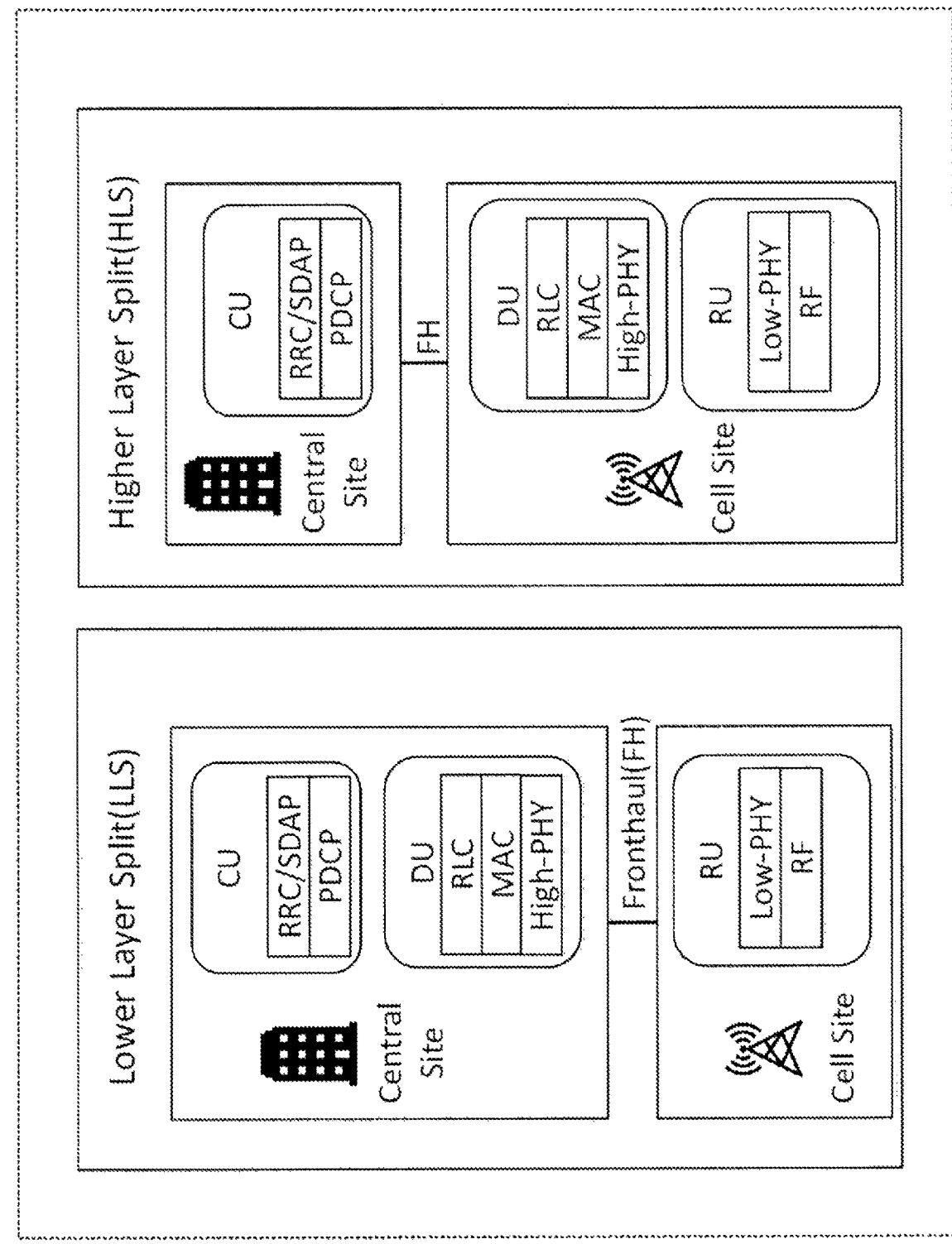
FIG. 1 is a diagram illustrating an example arrangement of functional modules of a base station.

FIG. 1 is a diagram illustrating an example arrangement of functional modules of a base station.

Functionality of a base station may include, for example, three functional modules: Centralized Unit (CU), Distributed Unit (DU), and Radio Unit (RU). Note that CU may also be called, for example, a centralized station, a centralized node, or an aggregated node. DU may also be called, for example, a distributed station or a distributed node. RU may also be called, for example, a radio station, an antenna unit, or a radio node.

Various combinations of individual functional modules of CU, DU and RU are possible. For example, two configurations: "Lower Layer Split (LLS) configuration" and "Higher Layer Split (HLS) configuration" illustrated in FIG. 1 are taken into consideration depending on whether the individual functional modules are disposed on the Cell Site (in other words, the radio frequency (RF) or antenna) side or on the Central Site (in other words, the core network) side.

In the LLS configuration, for example, RU may be disposed on the Cell Site side, while CU and DU may be disposed on the Central Site side. In the HLS configuration, DU and RU may be disposed on the Cell Site side, while CU may be disposed on the Central Site side. The Central Site and the Cell Site may be connected by, for example, an interface called Fronthaul (FH).

Figure 2:
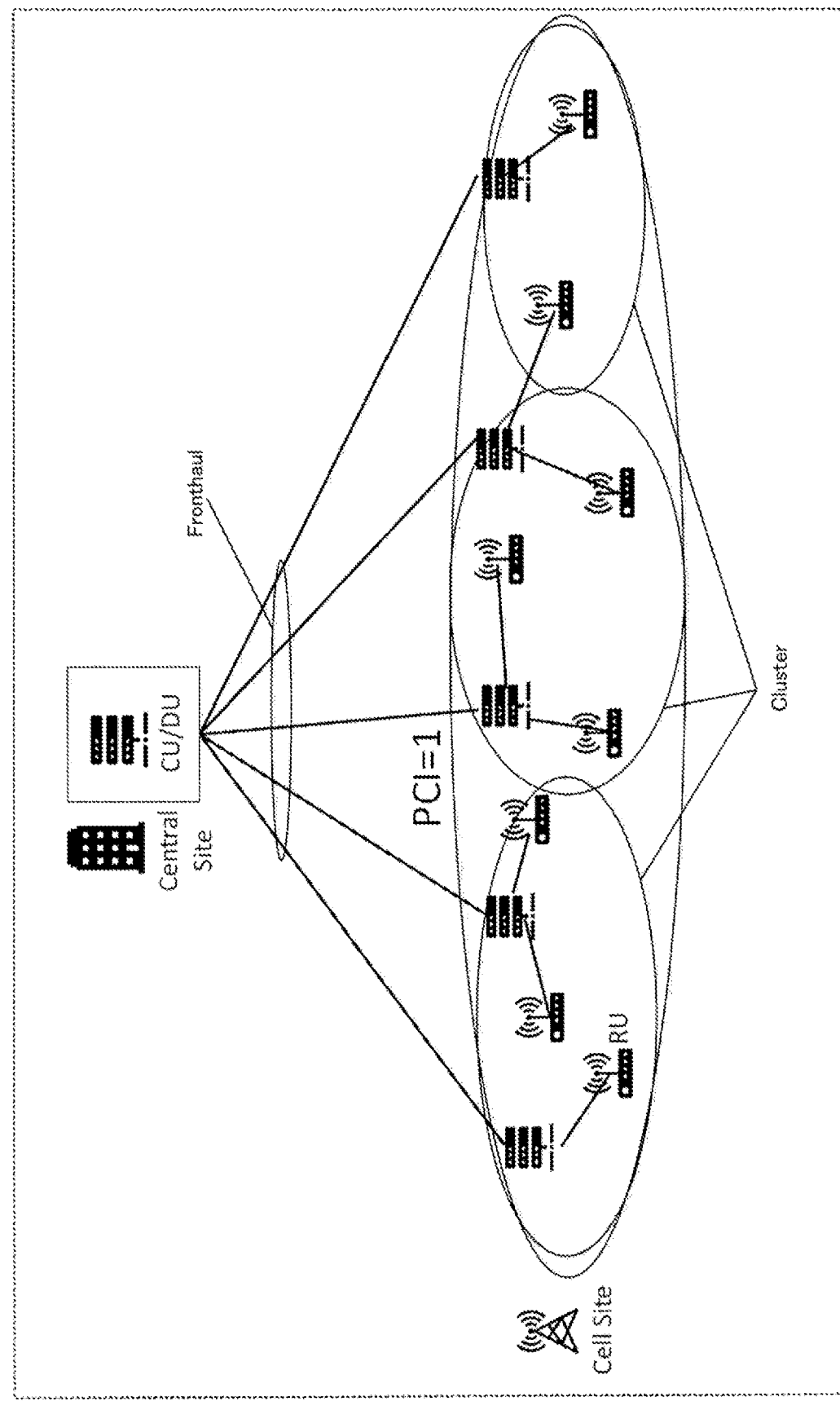
FIG. 2 is a diagram illustrating an example arrangement of cells in an LLS configuration.

FIG. 2 is a diagram illustrating an example arrangement of cells in the LLS configuration.

As illustrated in FIG. 2, in the LLS configuration, for example, a cell (called a macro cell, for example) may include RUs disposed on the Cell Site side (in other words, distributed antennas where a plurality of distributed RUs are disposed). For example, a macro cell may be divided into cells (called virtual cells or clusters, for example) in which some RUs out of the plurality of RUs disposed in the macro cell are included. Note that, for example, a single cell ID (for example, physical cell identity (PCI)) may be set in the macro cell illustrated in FIG. 2.

In the configuration illustrated in FIG. 2, for example, CU and DU disposed on the Central Site side (hereinafter also referred to as "CU/DU") may control each individual RU. In addition, for example, CU/DU may control radio resources on a cluster basis. Furthermore, for example, a cluster (for example, RUs forming the cluster) can be dynamically changed in accordance with the condition of propagation paths. In addition, in the LLS configuration, for example, CU/DU can improve the radio quality through cooperative control of a plurality of RUs in a macro cell.

Figure 3:
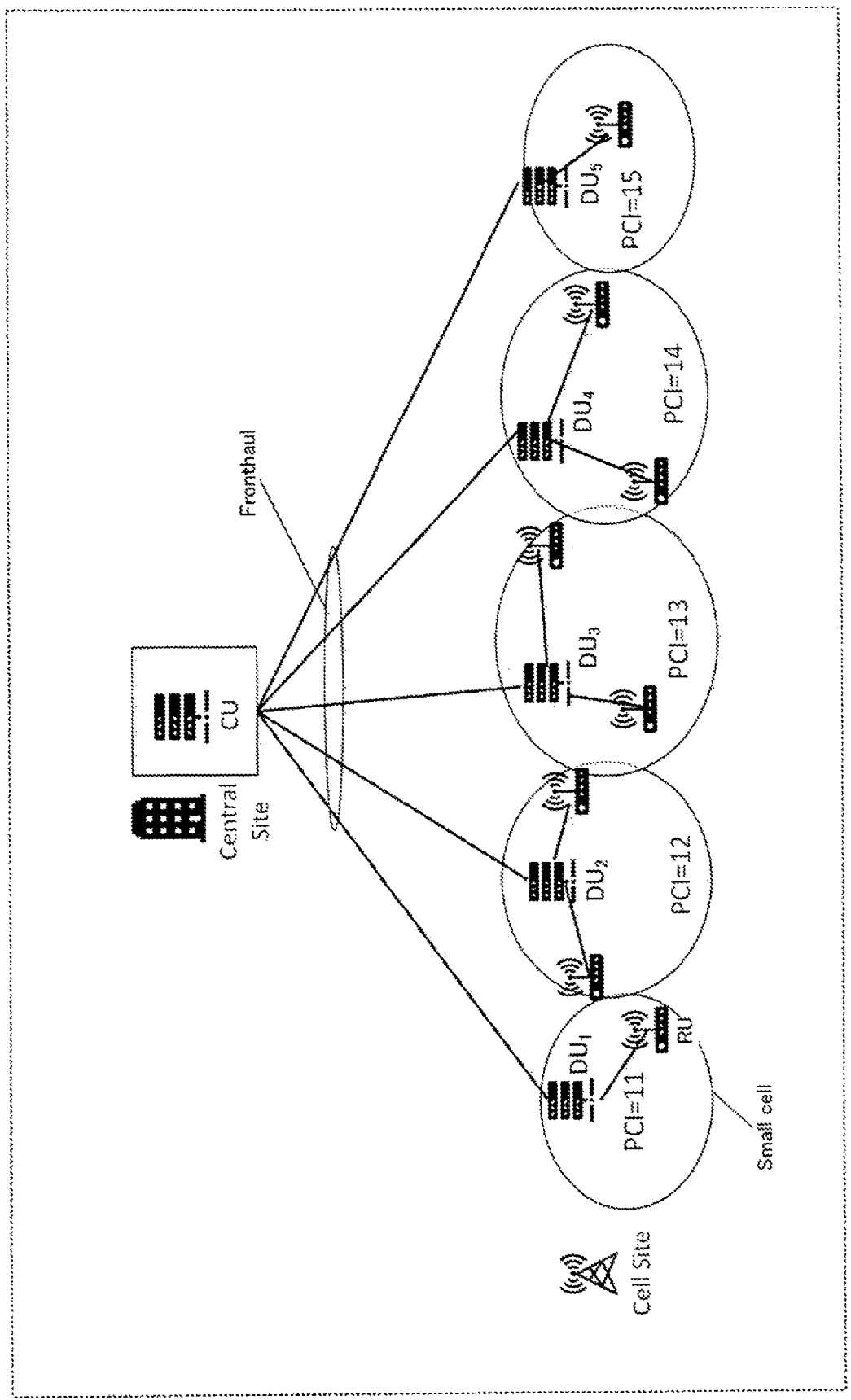
FIG. 3 is a diagram illustrating an example arrangement of cells in an HLS configuration.

FIG. 3 is a diagram illustrating an example arrangement of cells in the HLS configuration.

As illustrated in FIG. 3, in the HLS configuration, for example, a cell (called a small cell, for example) may include a DU disposed on the Cell Site side. For example, a DU corresponding to each individual small cell may control one or more RUs connected to (in other words, associated with) the DU. For example, the small cell formed in the HLS configuration illustrated in FIG. 3 is smaller than the macro cell formed in the LLS configuration illustrated in FIG. 2. Note that, for example, unique cell IDs (for example, PCI) may be set to the individual small cells illustrated in FIG. 3.

In the HLS configuration, for example, DU is disposed on the Cell Site side, and thus less delayed communication can be achieved than in the LLS configuration.

The LLS configuration and the HLS configuration have been described above.

The LLS configuration and the HLS configuration may be operated in a switchable manner with respect to, for example, a terminal (also called user equipment (UE), user terminal, or user). For example, either the LLS configuration or the HLS configuration may be selected depending on a service request (for example, a delay request) at the terminal or a traffic volume at the terminal. Furthermore, for example, in order to meet various requests from a large number of terminals, it is conceivable that the LLS configuration and the HLS configuration are operated in a shared manner. For example, in the LLS and HLS configurations, the fronthaul (FH) between the Cell Site and the Central Site and at least one of RUs may be shared. Therefore, for example, it is conceivable that fronthaul resources and radio resources between RU and UE are set or adjusted for each of the LLS configuration and the HLS configuration.

Figure 4:
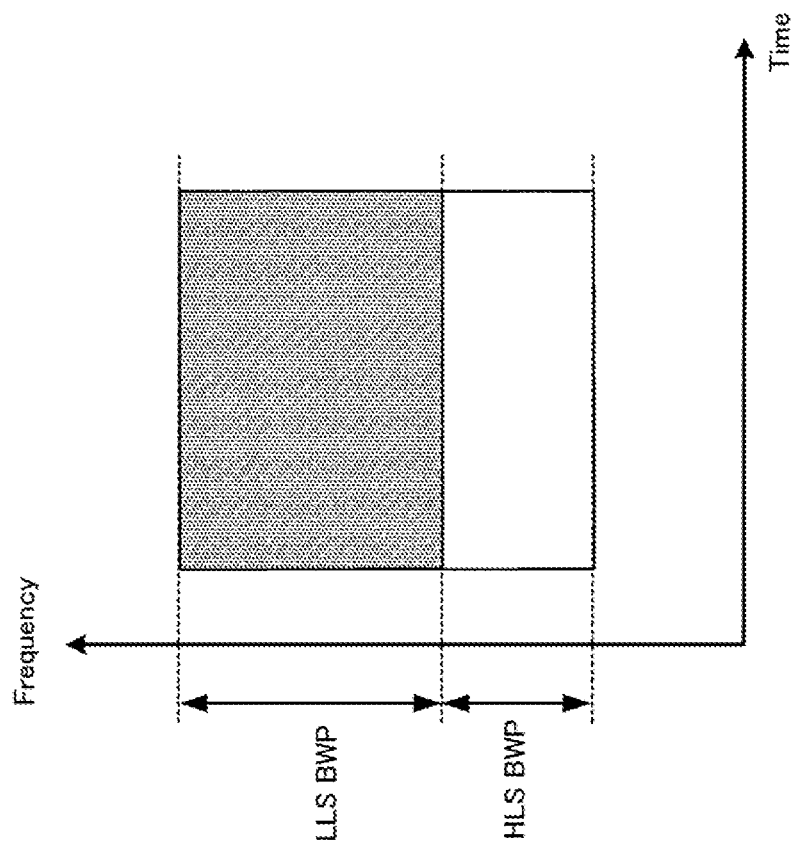
FIG. 4 is a diagram illustrating an example of allocation of frequency resources between LLS Distributed Unit (DU) and HLS DU.

For example, DU in the LLS configuration (hereinafter referred to as "LLS DU") and DU in the HLS configuration (hereinafter referred to as "HLS DU") may share RU. In this case, for example, a bandwidth to be used in a single RU (for example, a frequency resource) may be separated between LLS DU and HLS DU. For example, as illustrated in FIG. 4, a frequency resource in RU may be separated into a Bandwidth Part (BWP) for LLS DU (hereinafter referred to as "LLS BWP") and a BWP for HLS DU (hereinafter referred to as "HLS BWP").

Note here that RU does not need to have, for example, a function of identifying a terminal on the basis of information for identifying a terminal (for example, UE ID or a radio network temporary identifier (RNTI)). Therefore, RU may determine (that is, select) the transfer destination DU of uplink data (UL data) sent from the terminal, on the basis of bandwidths (for example, BWPs) in use for both the LLS configuration and the HLS configuration.

Figure 5:
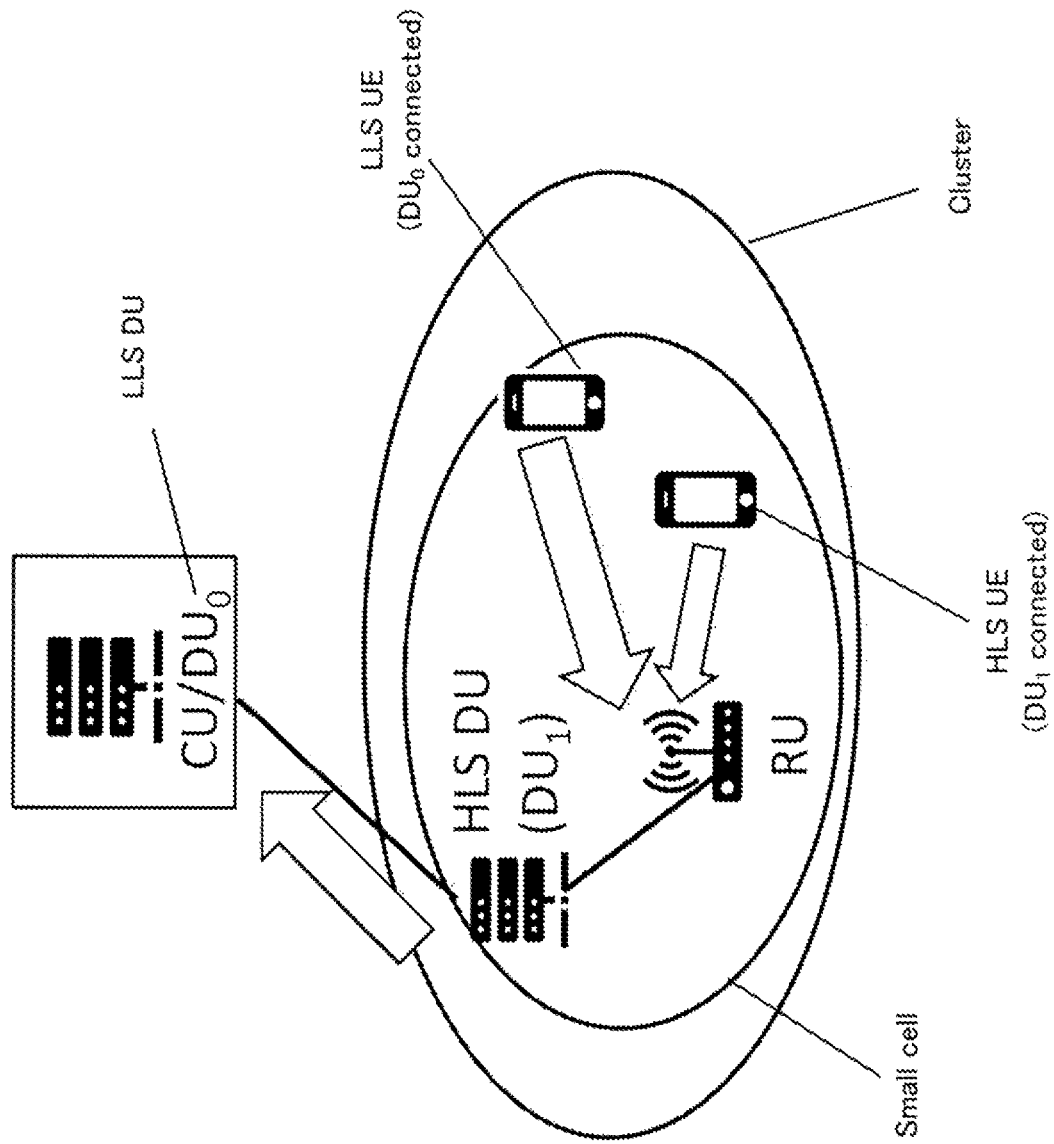
FIG. 5 is a diagram illustrating an example of UL data transfer by Radio Unit (RU)

FIG. 5 is a diagram showing example transfer of UL data by RU (for example, an example method for determining the transfer destination DU). In FIG. 5, $DU_0$ is LLS DU and $DU_1$ is HLS DU, for example. With reference to FIG. 5, $DU_0$ and $DU_1$ share RU (in other words, share a frequency bandwidth for the RU).

With reference to FIG. 5, for example, RU may determine the transfer destination DU of UL data sent from the UE connected to $DU_0$ (called LLS UE, for example) or the UE connected to $DU_1$ (called HLS UE, for example), on the basis of the frequency resource to which the UL data is allocated. For example, in the case where the allocated frequency resource for the UL data is included in LLS BWP, RU may determine that the transfer destination DU of the UL data is $DU_0$ (LLS DU). In addition, for example, in the case where the allocated frequency resource for the UL data is included in HLS BWP, RU may determine that the transfer destination DU of the UL data is $DU_1$ (HLS DU).

Here, the above-described method for determining the transfer destination DU of UL data may cause RU to erroneously determine the transfer destination DU of the UL data as described below.

For example, LLS DU may control resources on a cluster basis. In addition, the frequency bandwidth that can be used by LLS DU in RU (LLS BWP, for example) may overlap the frequency bandwidth that can be used by HLS DU in RU (HLS BWP, for example). For example, in accordance with the traffic in a cluster or in HLS DU, each DU (a medium access control (MAC) scheduler, for example) may set the resource allocation for each cluster or the resource allocation for HLS DU within the range of BWP corresponding to the DU. Therefore, different clusters in LLS DU may have different resource allocations between HLS DU and a cluster.

Figure 6:
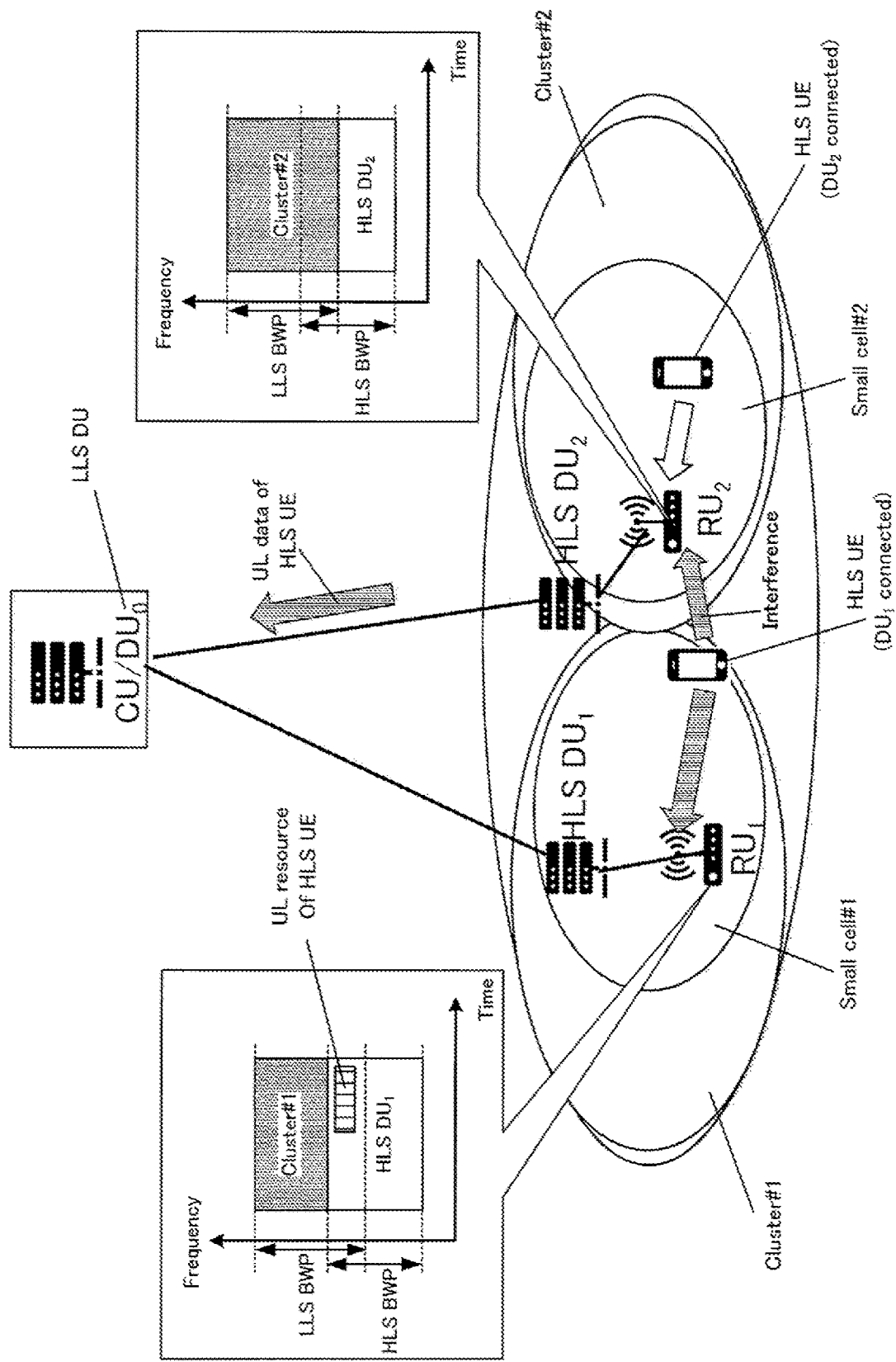
FIG. 6 is diagram illustrating an example of UL data transfer by RU.

FIG. 6 is diagram illustrating an example of UL data transfer by RU.

In FIG. 6, $DU_0$ is LLS DU, and $DU_1$ and $DU_2$ are each HLS DU, for example. With reference to FIG. 6, $DU_0$ (Cluster #1, for example) and $DU_1$ share $RU_1$ (in other words, share an allocated bandwidth for the RU). In addition, with reference to FIG. 6, $DU_0$ (Cluster #2, for example) and $DU_2$ share $RU_2$ (in other words, share an allocated bandwidth for the RU).

As illustrated in FIG. 6, LLS BWP and HLS BWP in the allocated bandwidth for $RU_1$ may overlap, while LLS BWP and HLS BWP in the allocated bandwidth for $RU_2$ may overlap. In addition, as illustrated in FIG. 6, for example, the resource allocation for Cluster #1 and $DU_1$ may be different from the resource allocation for Cluster #2 and $DU_2$. These resource allocations may be determined in accordance with the traffic in a cluster or in HLS DU, for example.

For example, with reference to FIG. 6, in the allocated bandwidth for $RU_1$, a bandwidth smaller than LLS BWP is allocated to Cluster #1, and a bandwidth corresponding to HLS BWP is allocated to HLS $DU_1$. On the other hand, for example, with reference to FIG. 6, in the allocated bandwidth for $RU_2$, a bandwidth corresponding to LLS BWP is allocated to Cluster #2, and a bandwidth smaller than HLS BWP is allocated to HLS $DU_2$. In other words, with reference to FIG. 6, the bandwidth where LLS BWP and HLS BWP overlap is allocated to DUs in different configurations (LLS and HLS).

With reference to FIG. 6, for example, since the allocated resource for the UL data sent from the HLS UE connected to HLS $DU_2$ is included in the bandwidth in use for HLS $DU_2$, $RU_2$ may determine that the transfer destination of the UL data is HLS $DU_2$.

In addition, since the HLS UE connected to HLS $DU_1$ illustrated in FIG. 6 is located, for example, near the boundary between Cluster #1 and Cluster #2, the UL data sent from the HLS UE can interfere with $RU_2$. Note here that, as illustrated in FIG. 6, the bandwidth that is in use for HLS $DU_1$ and allocated to the HLS UE connected to HLS $DU_1$ is the bandwidth where LLS BWP and HLS BWP overlap. Accordingly, with reference to FIG. 6, in the allocated bandwidth for $RU_2$, the allocated resource for the UL data sent from the HLS UE connected to HLS $DU_1$ is included in the bandwidth in use for LLS $DU_0$ (Cluster #2). Therefore, $RU_2$ may erroneously determine that the UL data is from LLS UE (not illustrated) and that the transfer destination of the UL data is LLS $DU_0$.

As described above, according to a method for identifying a terminal (in other words, a method for determining a transfer destination DU) on the basis of the bandwidth (BWP, for example) in use between LLS and HLS configurations for UL, there is a possibility that RU erroneously determines that UL data from the terminal connected to the HLS DU corresponding to an interfering another station (an adjacent RU, for example) is the UL data from the terminal connected to the LLS DU corresponding to the RU, and transfers the UL data to the LLS DU. Resultingly, the transmission efficiency of UL signals may be decreased.

Therefore, in an exemplary embodiment of the present disclosure, a method for improving the transmission efficiency of UL signals will be described.

First Exemplary Embodiment

[Configuration of Wireless Communication System]

Figure 7:
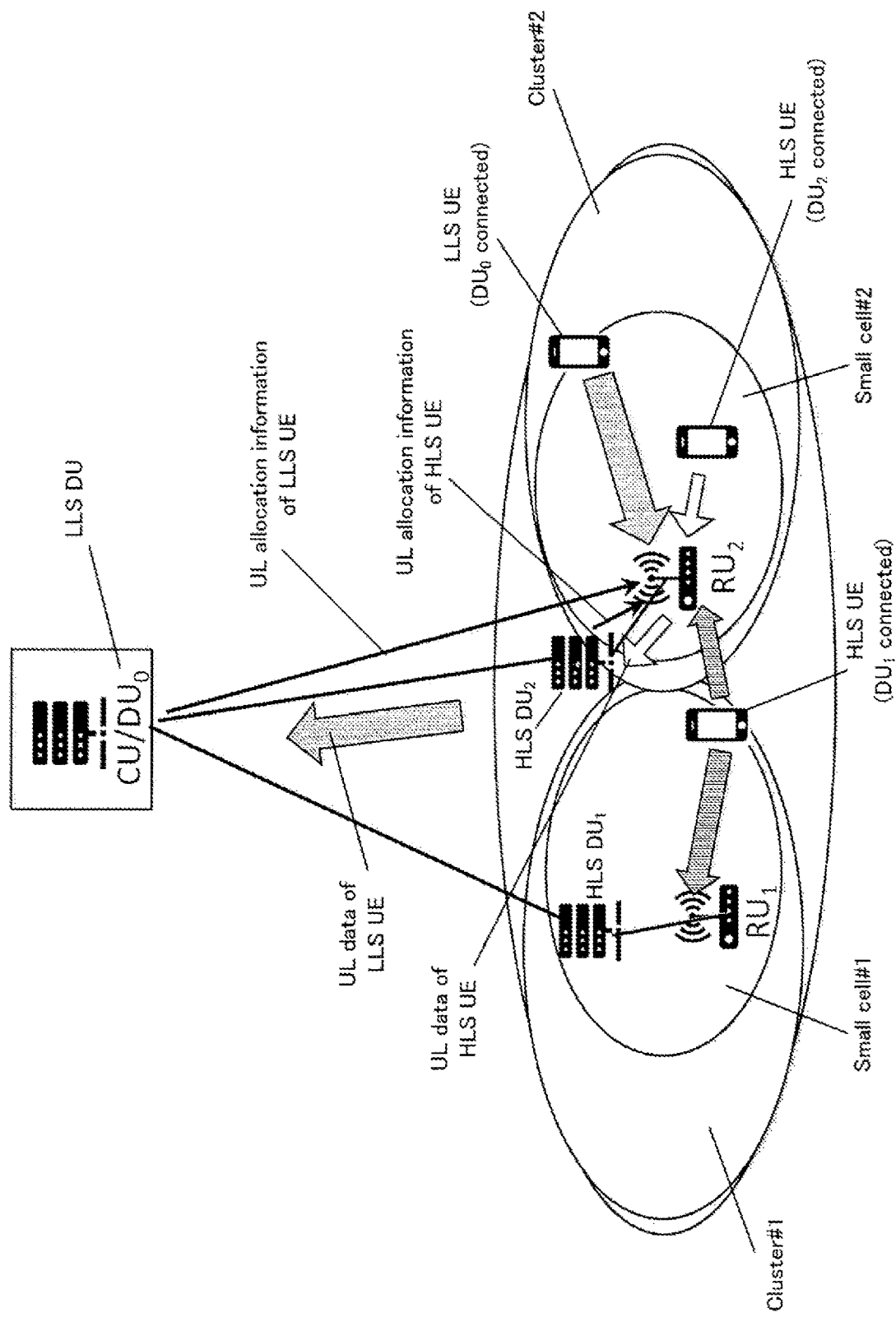
FIG. 7 is a diagram illustrating an example configuration of a wireless communication system according to a first exemplary embodiment.

FIG. 7 is a diagram illustrating an example configuration of a wireless communication system according to the present exemplary embodiment.

The wireless communication system according to the present exemplary embodiment includes, for example, at least a base station (for example, CU, DU, and RU) and a terminal (for example, UE).

The base station can be switched between an LLS configuration and an HLS configuration, for example. In FIG. 7, $DU_0$ is LLS DU and $DU_1$ and $DU_2$ are each HLS DU, for example. With reference to FIG. 7, $DU_0$ (Cluster #1, for example) and $DU_1$ share $RU_1$. With reference to FIG. 7, $DU_0$ (Cluster #2, for example) and $DU_2$ share $RU_2$.

For example, with reference to FIG. 7, individual RUs (for example, $RU_1$ and $RU_2$) may transfer UL data to LLS $DU_0$, the UL data being sent from the LLS UE connected to LLS $DU_0$. In addition, for example, with reference to FIG. 7, individual RUs (for example, $RU_1$ and $RU_2$) may transfer UL data to HLS DU, the UL data being sent from HLS UE connected to HLS DU (for example, $DU_1$ and $DU_2$). Note that an example of how RU determines the transfer destination DU of UL data will be described later.

Figure 8:
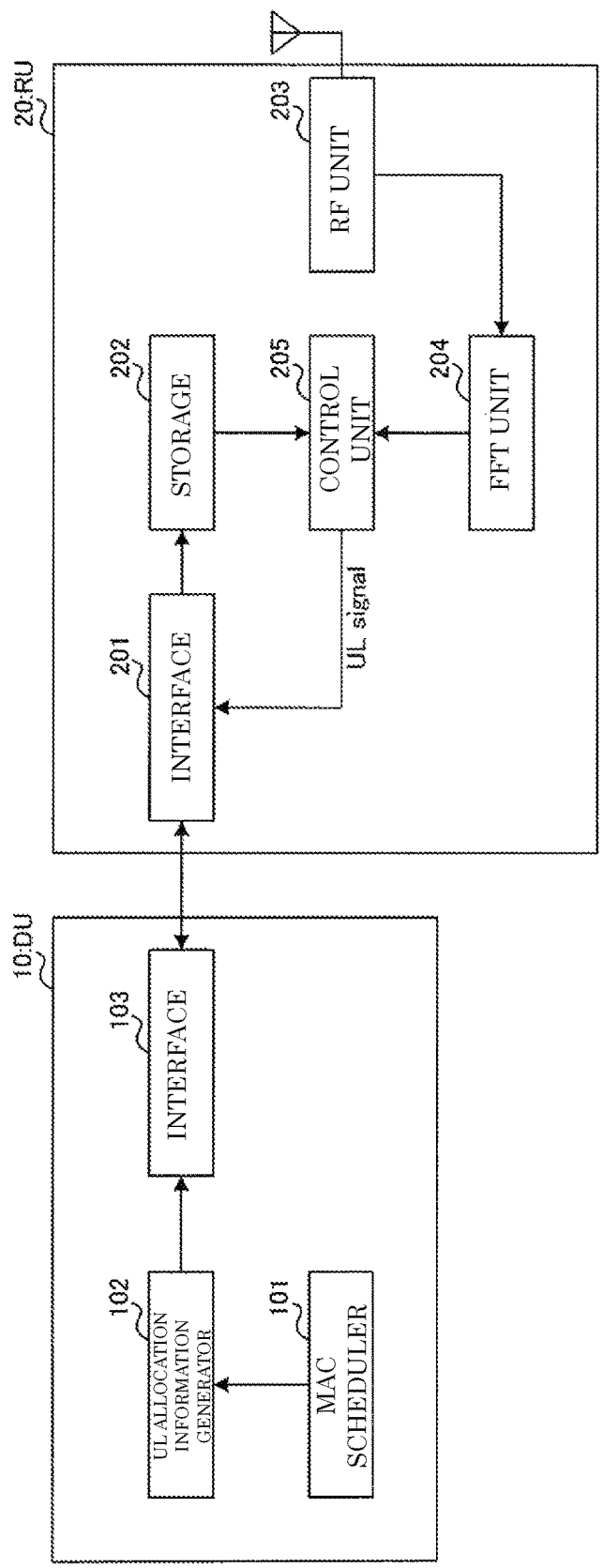
FIG. 8 is block diagram illustrating example configurations of DU and RU according to the first exemplary embodiment.

FIG. 8 is a block diagram illustrating example configurations of DU 10 and RU 20 according to the present exemplary embodiment. For example, each of LLS $DU_0$, HLS $DU_1$, and HLS $DU_2$ illustrated in FIG. 7 may have the configuration of DU 10 shown in FIG. 8. Furthermore, for example, each of $RU_1$ and $RU_2$ illustrated in FIG. 7 may have the configuration of RU 20 shown in FIG. 8.

DU 10 shown in FIG. 8 may include, for example, MAC scheduler 101, UL allocation information generator 102, and interface 103.

MAC scheduler 101 may control, for example, resource allocation in DU 10 (for example, in a cluster or HLS DU). For example, MAC scheduler may determine the bandwidth to be used for the cluster and HLS DU on the basis of the traffic volume in the cluster or HLS DU. In addition, MAC scheduler 101 may allocate, for example, a resource for UL data to UE (for example, LLS UE or HLS UE) in the bandwidth in use for each of the cluster and HLS DU. MAC scheduler 101 may output, for example, information indicating the scheduling result to UL allocation information generator 102.

UL allocation information generator 102 may generate, for example, UL allocation information indicating an allocated resource for UL data (including, for example, a frequency resource and a time resource) for each UE (for example, LLS UE and HLS UE) on the basis of the information indicating the scheduling result as output from MAC scheduler 101. UL allocation information generator 102 may output, for example, the generated UL allocation information to interface 103.

Interface 103 may communicate with, for example, RU 20. For example, interface 103 may send the UL allocation information, as output from UL allocation information generator 102, to RU 20 (for example, to interface 201).

In addition, for example, interface 103 may send to RU 20 downlink control information (DL control signals called, for example, Physical Downlink Control Channel (PDCCH) or Downlink Control Information (DCI)) for a terminal or downlink data (DL data including, for example, Physical Downlink Shared Channel (PDSCH)) for a terminal. In addition, for example, interface 103 may receive uplink control signals (UL control signals called, for example, Physical Uplink Control Channel (PUCCH) or Uplink Control Information (UCI)) or uplink data (UL data including, for example, Physical Uplink Shared Channel (PUSCH)) sent from RU 20.

RU 20 shown in FIG. 8 may include, for example, interface 201, storage 202, RF (radio frequency) unit 203, fast Fourier transform (FFT) unit 204, and control unit 205.

Interface 201 may communicate with, for example, DU 10. For example, interface 201 may receive UL allocation information sent from DU 10 (interface 103) and output the UL allocation information to storage 202. Furthermore, for example, interface 103 may send a UL signal such as a UL control signal or UL data, as output from control unit 205, to DU 10 in accordance with an instruction from control unit 205 (for example, an instruction regarding the transfer destination DU).

In addition, for example, interface 201 may receive, from DU 10, a DL signal for a terminal such as a DL control signal or DL data sent from RU 20. RU 20 may send (that is, transfer), for example, the DL signal received from DU 10 to the terminal (not illustrated).

Storage 202 may store, for example, the UL allocation information output from interface 201.

RF unit 203 may have wireless communication with, for example, a terminal (UE, for example). For example, RF unit 203 may receive a UL signal sent from the terminal and output the UL signal to FFT unit 204. The transmission waveform of a UL signal sent from the terminal may be, for example, a waveform like Orthogonal Frequency Division Multiplexing (OFDM). Note that the transmission waveform of a UL signal is not limited to the OFDM waveform.

FFT unit 204 performs FFT processing on the UL signal output from the RF unit 203, and outputs the resulting UL signal after FFT to control unit 205.

Control unit 205 may control, for example, transfer of UL signals to a plurality of DUs 10, on the basis of the UL allocation information for terminals (LLS UE and HLS UE, for example) as stored in storage 202. For example, control unit 205 may determine the transfer destination DU (LLS DU or HLS DU) of the UL signal output from FFT unit 204, on the basis of the UL allocation information. Control unit 205 may output information regarding the determined transfer destination DU to interface 201. Note that an example of how RU 20 (control unit 205, for example) determines the transfer destination DU of a UL signal will be described later.

[Example Operations of DU 10 and RU 20]

The following describes example operations of above-described DU 10 and RU 20.

Figure 9:
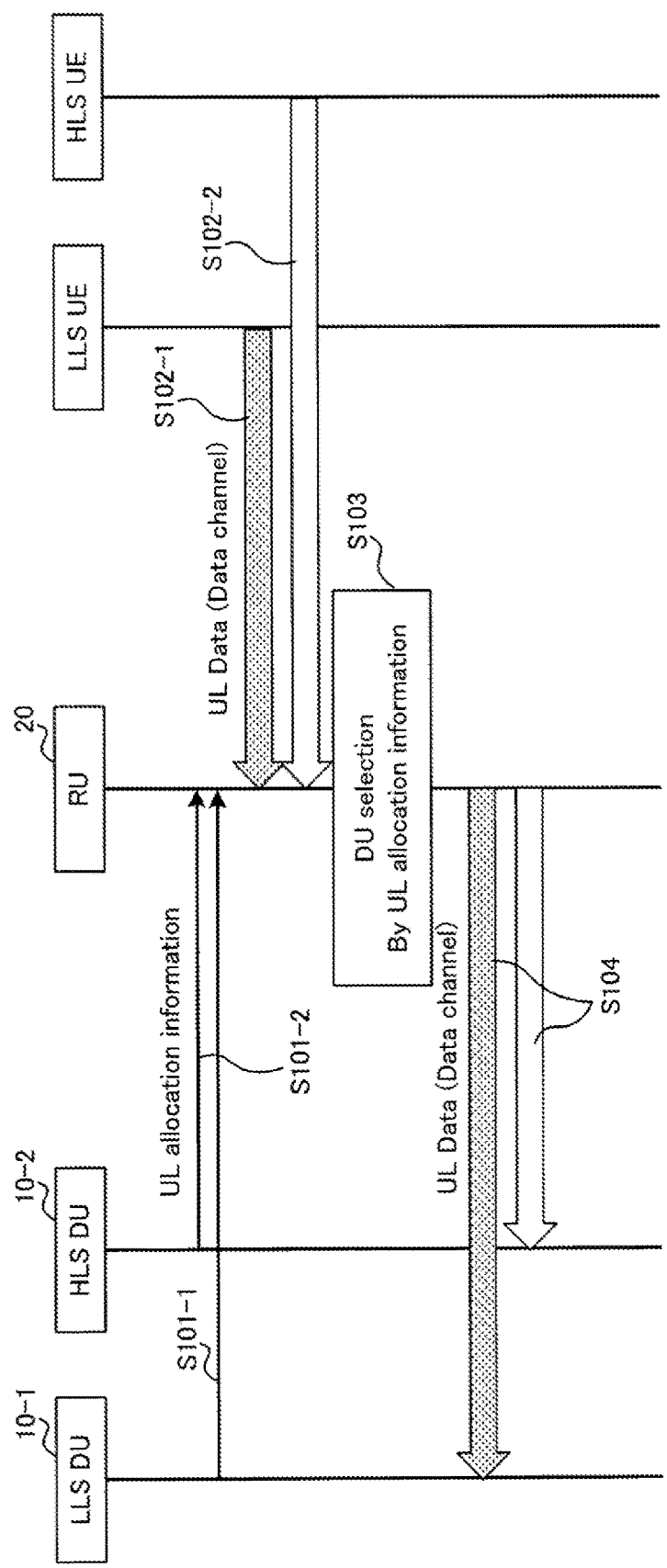
FIG. 9 is a sequence diagram illustrating an example of UL signal transmission according to the first exemplary embodiment.

FIG. 9 is a sequence diagram illustrating example operations of DU 10 and RU 20 for UL data transmission.

With reference to FIG. 9, for example, LLS DU and HLS DU each may have the configuration of DU 10 shown in FIG. 8 (denoted as DU 10-1 and DU 10-2, for example), and RU may have the configuration of RU 20 shown in FIG. 8.

For example, LLS DU may send, to RU 20 corresponding to the LLS DU, the UL allocation information indicating an allocated resource for the UL data sent by the terminal (LLS UE) connected to the LLS DU (S101-1). In addition, HLS DU may send, to RU 20 corresponding to the HLS DU, the UL allocation information indicating an allocated resource for the UL data sent by the terminal (HLS UE) connected to the HLS DU (S101-2). For example, RU 20 may store the UL allocation information received from each of LLS DU and HLS DU.

Notification of the UL allocation information may be given at a timing when, for example, DU 10 sends a DL control signal (PDCCH, for example) including allocation information (also called UL scheduling grant or UL grant, for example) indicating an allocated resource for UL data to the terminal, or may be given at another timing.

FIG. 10 is a diagram showing an example of the UL allocation information held by RU 20. For example, FIG. 10 shows the UL allocation information for UEs connected to LLS DU, as notified by LLS DU, and the UL allocation information for UEs connected to HLS DU, as notified by HLS DU.

The UL allocation information may include, for example, the following parameters.

A value for identifying DU (DU index, for example)
A value for identifying UE (UE ID or RNTI, for example)
A start number (Start RB index, for example) of the frequency resource (resource block (RB) or physical RB (PRB)) to which UL data is allocated
The number of consecutive frequency resources (Number of Consecutive RBs, for example) to which UL data is allocated
A value for identifying the subframe to which UL data is allocated (Subframe index, for example)
A value for identifying the slot to which UL data is allocated (Slot index, for example)
A start number of the symbol to which UL data is allocated (Start symbol index, for example)
The number of consecutive symbols to which UL data is allocated (Number of Consecutive symbols, for example)

Note that parameters included in the UL allocation information are not limited to the above-mentioned parameters, but may include other parameters relating to UL allocated resources (for example, frequency resources and time resources). For example, the UL allocation information may not necessarily include a value for identifying UE (UE ID or RNTI, for example) among the parameters shown in FIG. 10.

In addition, notification of the UL allocation information shown in FIG. 10 may be given individually to RU 20 for each target UE of allocation (for example, on the basis of UE ID), or may be collectively given to RU 20 for a plurality of UEs. For example, DU 10 may notify RU 20 of the UL allocation information every time a UL resource is allocated to UE. Furthermore, DU 10 (LLS DU or HLS DU, for example) may notify RU 20 of each of the plurality of parameters included in the UL allocation information shown in FIG. 10, or of at least two parameters together at a time. For example, DU 10 may notify RU 20 of each of the parameters included in the UL allocation information shown in FIG. 10 every time the parameter is updated.

With reference to FIG. 9, for example, LLS UE may send UL data (for example, a data channel such as PUSCH) to RU 20 (S102-1), and HLS UE may send UL data to RU 20 (S102-2).

RU 20 may, for example, determine (that is, select) the transfer destination DU of the received UL data, on the basis of the UL allocation information as notified by each of the plurality of DUs 10 (S103). Then, RU 20 may, for example, send the UL data to the determined transfer destination DU (S104).

As an example, the following describes example operations of $RU_2$ shown in FIG. 7.

As illustrated in FIG. 7, $RU_2$ is the RU corresponding to LLS $DU_0$ and HLS $DU_2$ (in other words, the RU shared by LLS $DU_0$ and HLS $DU_2$). For example, as shown in FIG. 10, $RU_2$ may receive from LLS $DU_0$ the UL allocation information relating to LLS UE connected to LLS $DU_0$, and may receive from HLS $DU_2$ the UL allocation information relating to HLS UE connected to HLS $DU_2$.

For example, $RU_2$ may control transfer of UL data to LLS $DU_0$ and HLS $DU_2$ on the basis of the UL allocation information.

For example, when $RU_2$ receives the UL data allocated to a resource indicated in the UL allocation information relating to LLS UE, $RU_2$ may determine that the transfer destination DU of the UL data is LLS $DU_0$. In other words, for example, when $RU_2$ receives the UL data allocated to a resource indicated in the UL allocation information relating to LLS UE, $RU_2$ may determine that the UL data has been sent from LLS UE. As an example, suppose that the resource to which the UL data received by $RU_2$ is allocated represents the temporal timing of Subframe index=2, Slot index=0, and Symbol index=9 to 13, and the frequency resource of RB index=15 to 20. Then, $RU_2$ may determine that the UE is LLS UE of UE ID=3578 by referencing the UL allocation information relating to LLS UE shown in FIG. 10 and may transfer the UL data to LLS $DU_0$.

Furthermore, for example, when $RU_2$ receives the UL data allocated to a resource indicated in the UL allocation information relating to HLS UE, $RU_2$ may determine that the transfer destination DU of the UL data is HLS $DU_2$. In other words, when $RU_2$ receives the UL data allocated to a resource (for example, Start RB index=0) indicated in the UL allocation information relating to HLS UE, $RU_2$ may determine that the UL data has been sent from HLS UE. As an example, suppose that the resource to which the UL data received by $RU_2$ is allocated represents the temporal timing of Subframe index=7, Slot index=0, and Symbol index=9 to 13, and the frequency resource of RB index=0 to 7. Then, $RU_2$ may determine that the UE is HLS UE of UE ID=980 by referencing the UL allocation information relating to HLS UE shown in FIG. 10 and may transfer the UL data to HLS $DU_2$.

In this way, $RU_2$ may determine that the transmission source DU, which is LLS $DU_0$ or HLS $DU_2$, for example, that has sent the UL allocation information indicating the resource to which the UL data received by $RU_2$ from UE is allocated is the transfer destination of the received UL data. Alternatively, $RU_2$ may determine the transfer destination of the UL data according to an indication of DU index in the UL allocation information.

On the other hand, for example, $RU_2$ does not need to transfer the UL data received in a resource that does not match the UL allocation information relating to either of LLS UE and HLS UE (in other words, $RU_2$ may determine that the UL data is to be discarded or not to be transferred).

For example, with reference to FIG. 7, $RU_2$ stores the UL allocation information relating LLS UE connected to LLS $DU_0$ and the UL allocation information relating to HLS UE connected to HLS $DU_2$ as described above, while $RU_2$ does not need to store the UL allocation information relating to HLS UE connected to HLS $DU_1$. Therefore, when, for example, $RU_2$ receives the UL data sent from HLS UE connected to HLS $DU_1$ and $RU_2$ does not have the UL allocation information indicating the resource to which the UL data is allocated, $RU_2$ does not need to transfer the UL data. In other words, when, for example, $RU_2$ receives any UL data allocated to a resource different from the resource indicated in the UL allocation information, $RU_2$ may determine that the UL data has been sent from UE connected to another station (in other words, the UL data is a signal that may cause interference).

As described above, when, for example, $RU_2$ does not have any UL allocation information indicating the resource to which the UL data that $RU_2$ received from UE is allocated, $RU_2$ may determine that the UL data is not to be transferred.

In the present exemplary embodiment, for example, RU 20 receives, from each of DU 10-1 and DU 10-2 (corresponding to a first DU and a second DU, for example) that control RU 20, the UL control information regarding uplink resource allocation (for example, the resource allocation information regarding uplink data included in PDCCH) for the terminals connected to DU 10-1 and DU 10-2, respectively. Then, RU 20 controls transfer of a received UL signal (for example, UL data) to either DU 10-1 or DU 10-2 (for example, determines the transfer destination DU of the signal or determines whether to transfer the signal) on the basis of the UL allocation information.

This transfer control enables RU 20 to correctly determine the transfer destination of UL data even when, for example, the resource allocation between LLS DU and HLS DU differs among clusters in the LLS configuration.

As a result, for example, UL data can be inhibited from being sent to a wrong destination in the fronthaul (FH), and thus the traffic in the fronthaul can be reduced to improve the transmission efficiency. Therefore, according to the present exemplary embodiment, the efficiency of wireless communication in UL can be improved even in a configuration in which functionality of a base station is separated into functional modules such as CU, DU, and RU and the individual functional modules are dynamically disposed in Central Site and Cell Site.

Second Exemplary Embodiment

In the first exemplary embodiment, description is given regarding the case where DU notifies RU of UL allocation information. In the present exemplary embodiment, description is given regarding a case where, for example, RU acquires UL allocation information (for example, UL scheduling grant) included in the control information sent from DU to a terminal. In other words, in the present exemplary embodiment, DU does not need to notify RU of UL allocation information.

Figure 11:
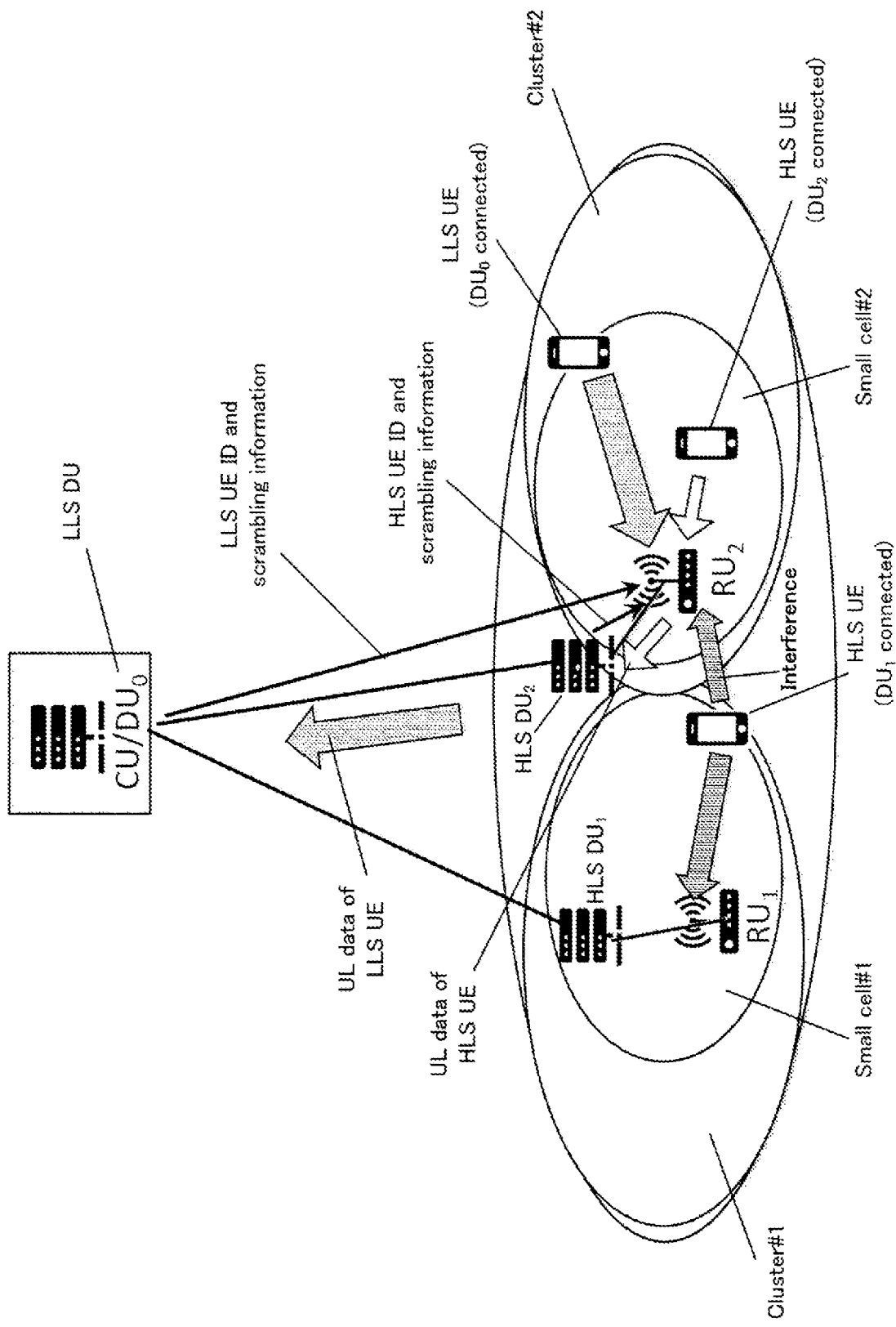
FIG. 11 is a diagram illustrating an example configuration of a wireless communication system according to a second exemplary embodiment.

FIG. 11 is a diagram illustrating an example configuration of a wireless communication system according to the present exemplary embodiment.

As in the first exemplary embodiment, the wireless communication system according to the present exemplary embodiment includes, for example, at least a base station (for example, CU, DU, and RU) and a terminal (for example, UE).

The base station can be switched between an LLS configuration and an HLS configuration, for example. In FIG. 11, $DU_0$ is LLS DU and $DU_1$ and $DU_2$ are each HLS DU, for example. With reference to FIG. 11, $DU_0$ (Cluster #1, for example) and $DU_1$ share $RU_1$. With reference to FIG. 11, $DU_0$ (Cluster #2, for example) and $DU_2$ share $RU_2$.

For example, with reference to FIG. 11, individual RUs (for example, $RU_1$ and $RU_2$) may transfer UL data to LLS $DU_0$, the UL data being sent from LLS UE connected to LLS $DU_0$. In addition, for example, with reference to FIG. 11, individual RUs (for example, each of $RU_1$ and $RU_2$) may transfer UL data to HLS DU, the UL data being sent from HLS UE connected to HLS DU (for example, $DU_1$ and $DU_2$). Note that an example of how RU determines the transfer destination DU of UL data will be described later.

Figure 12:
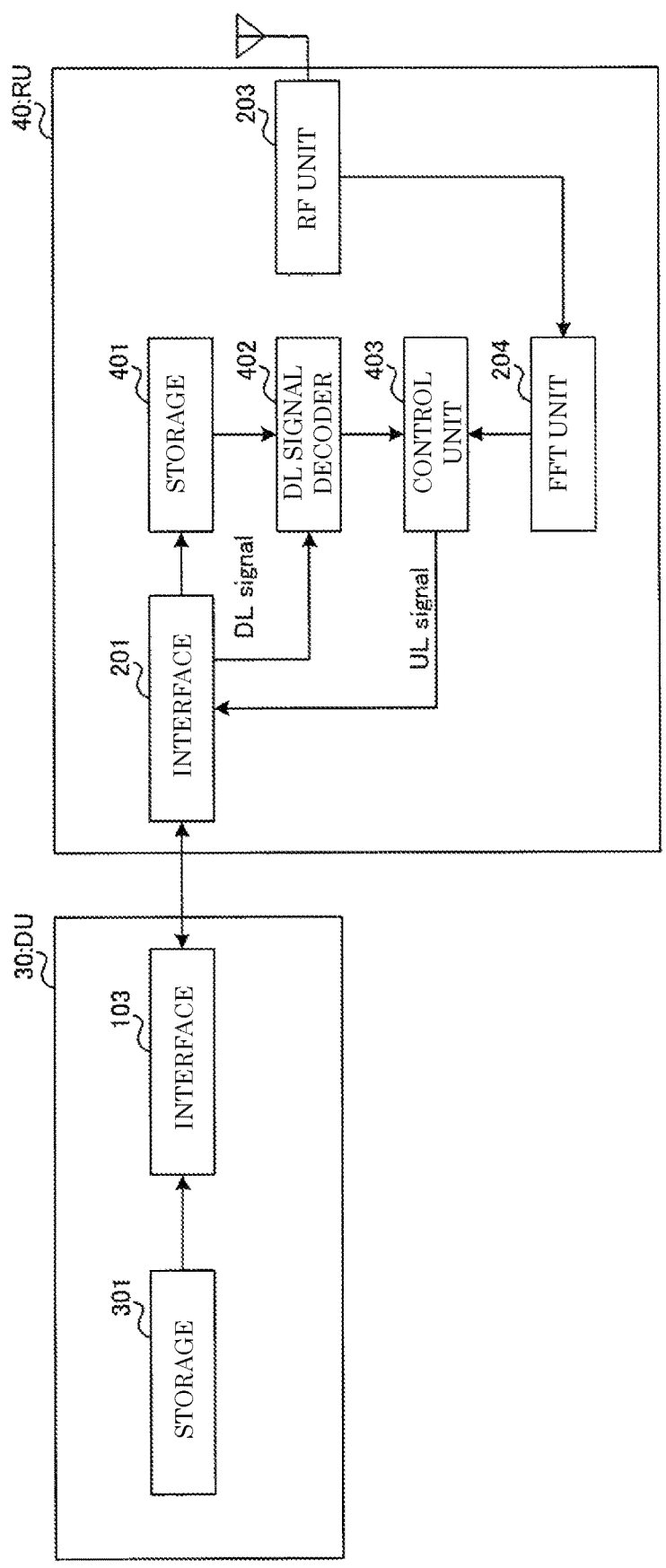
FIG. 12 is block diagram illustrating example configurations of DU and RU according to the second exemplary embodiment.

FIG. 12 is a block diagram illustrating example configurations of DU 30 and RU 40 according to the present exemplary embodiment. Note that components in FIG. 12 similar to those in the first exemplary embodiment (FIG. 8) are given identical reference symbols and description of these components is omitted. For example, each of LLS $DU_0$, HLS $DU_1$, and HLS $DU_2$ illustrated in FIG. 11 may have the configuration of DU 30 shown in FIG. 12. Furthermore, for example, each of $RU_1$ and $RU_2$ illustrated in FIG. 11 may have the configuration of RU 40 shown in FIG. 12.

In DU 30 illustrated in FIG. 12, storage 301 may store, for example, information regarding the terminal (UE, for example) connected to DU 30 (hereinafter referred to as terminal information). The terminal information may include, for example, parameters used for decoding a DL control signal for a terminal (PDCCH, for example) such as identification information (UE ID or RNTI, for example) and scrambling information (Cell ID (PCI), for example). To storage 301, for example, the terminal information that is set every time a terminal is connected (that is, attached) to DU 30 may be input.

DU 30 may send, for example, the terminal information including terminal identification information and scrambling information to RU 40 via interface 103.

In RU 40 shown in FIG. 12, storage 401 may store, for example, the terminal information (including, for example, terminal identification information and scrambling information) sent from DU 30 via interface 201.

DL signal decoder 402 may decode, using the terminal information stored in storage 401, a DL control signal (PDCCH, for example) included in the DL signals output from interface 201 to acquire the UL allocation information (for example, the resource allocation information including UL scheduling grant, such as resource block assignment information of DCI format 0) for the terminal. In other words, RU 40 may intercept the UL allocation information, notification of which is given by DU 30 to the terminal. DL signal decoder 402 may output the acquired UL allocation information to control unit 403.

As in the first exemplary embodiment, control unit 403 may control, for example, transfer of UL signals to a plurality of DUs 30, on the basis of the UL allocation information for terminals (LLS UE and HLS UE, for example) as input from DL signal decoder 402. For example, control unit 403 may determine the transfer destination DU (LLS DU or HLS DU) of the UL signal output from FFT unit 204, on the basis of the UL allocation information. Control unit 403 may output, for example, information regarding the determined transfer destination DU to interface 201. Note that an example of how RU 40 (control unit 403, for example) determines the transfer destination DU of a UL signal will be described later.

[Example Operations of DU 30 and RU 40]

The following describes example operations of above-described DU 30 and RU 40.

Figure 13:
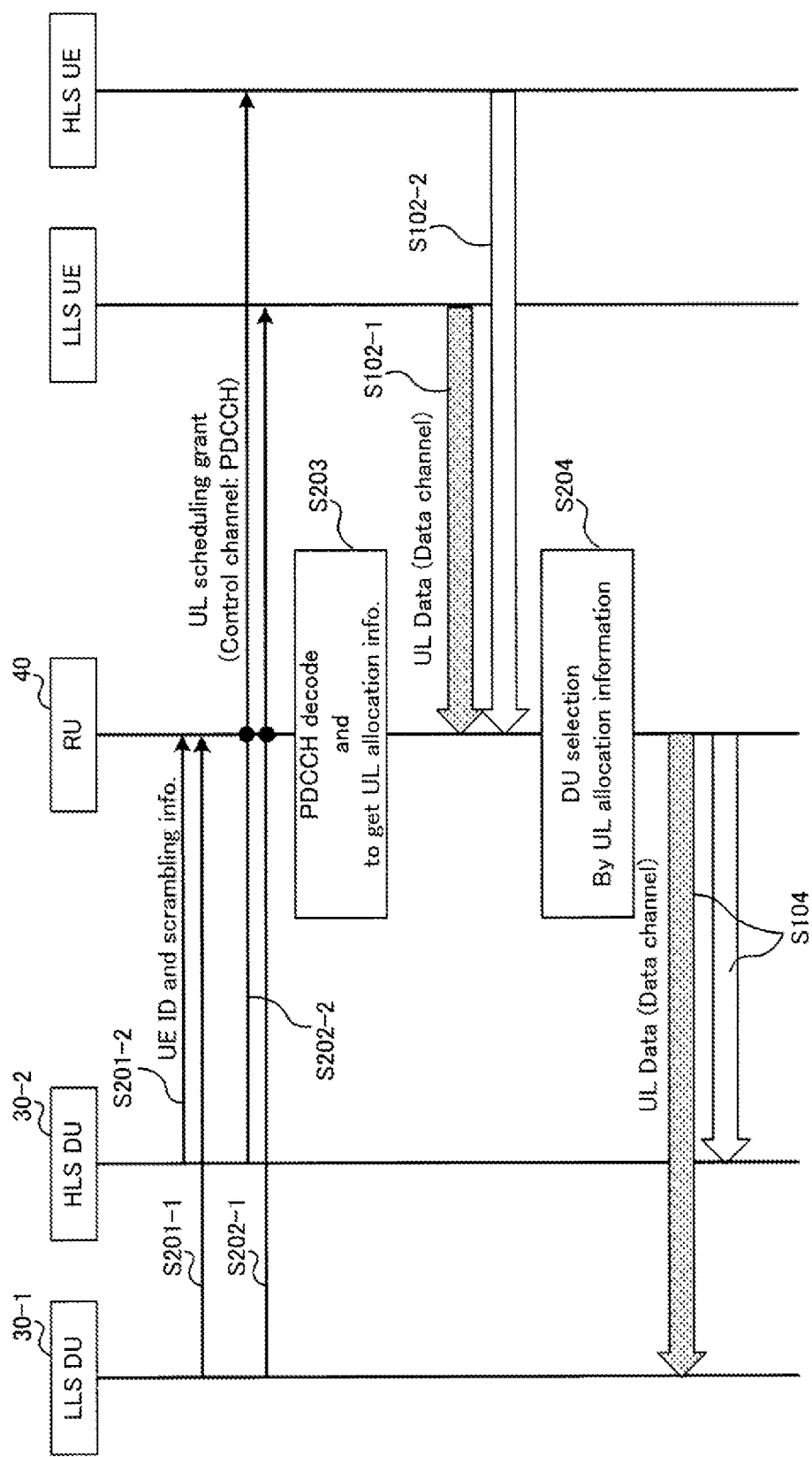
FIG. 13 is a sequence diagram illustrating an example of UL signal transmission according to the second exemplary embodiment.

FIG. 13 is a sequence diagram illustrating example operations of DU 30 and RU 40 for UL data transmission. Note that operations in FIG. 13 similar to those in the first exemplary embodiment (FIG. 9, for example) are given identical reference symbols and description of these operations is omitted.

With reference to FIG. 13, for example, LLS DU and HLS DU each may have the configuration of DU 30 shown in FIG. 12 (denoted as DU 30-1 and DU 30-2, for example), and RU may have the configuration of RU 40 shown in FIG. 12.

For example, LLS DU may send, to RU 40 corresponding to the LLS DU, the terminal information (for example, UE ID and scrambling information) regarding the terminal (LLS UE) connected to the LLS DU (S201-1). HLS DU may send, to RU 40 corresponding to the HLS DU, the terminal information regarding the terminal (HLS UE) connected to the HLS DU (S201-2). For example, RU 40 may store the terminal information received from each of LLS DU and HLS DU.

Notification of the terminal information may be given at a timing when, for example, the terminal is connected (that is, attached) to DU 30, or at another timing.

FIG. 14 is a diagram showing an example of the terminal information held by RU 40. For example, FIG. 14 shows the terminal information regarding UEs connected to LLS DU, as notified by LLS DU, and the terminal information regarding UEs connected to HLS DU, as notified by HLS DU.

The terminal information may include, for example, the following parameters.

A value for identifying DU (DU index, for example)
Scrambling information (PCI, for example)
Terminal identification information (UE ID or RNTI, for example)

Note that parameters included in the terminal information are not limited to the above-mentioned parameters but may include other parameters relating to decoding of DL control signals.

In addition, notification of the terminal information shown in FIG. 14 may be given individually to RU 40 for each target UE of allocation (for example, on the basis of UE ID), or may be collectively given to RU 40 for a plurality of UEs. For example, every time UE is connected (that is, attached) to DU 30, DU 30 may notify RU 40 of the terminal information regarding the UE. Furthermore, DU 30 (LLS DU or HLS DU, for example) may notify RU 40 of each of the plurality of parameters included in the terminal information shown in FIG. 14, or of at least two parameters together at a time. In addition, when it is detected that the UE is detached, the terminal information may be deleted as appropriate.

With reference to FIG. 13, for example, LLS DU notifies, via RU 40, LLS UE of a DL control signal (PDCCH, for example) for the LLS UE including UL allocation information (UL scheduling grant, for example) indicating an allocated resource for UL data sent by the LLS UE (S202-1). Likewise, for example, HLS DU notifies, via RU 40, HLS UE of a DL control signal (PDCCH, for example) including UL allocation information for the HLS UE (UL scheduling grant, for example) indicating an allocated resource for UL data sent by the HLS UE (S202-2).

On the basis of the terminal information as notified by each of LLS DU and HLS DU, RU 40 decodes the DL control signal (PDCCH, for example) sent from each of LLS DU and HLS DU for UE to acquire the UL allocation information included in the DL control signal (S203).

On the basis of the acquired UL allocation information, RU 40 may, for example, determine (that is, select) the transfer destination DU of the received UL data as in the first exemplary embodiment (S204).

As an example, the following describes example operations in $RU_2$ shown in FIG. 11.

As illustrated in FIG. 11, $RU_2$ is the RU corresponding to LLS $DU_0$ and HLS $DU_2$ (in other words, the RU shared by LLS $DU_0$ and HLS $DU_2$). For example, as shown in FIG. 14, $RU_2$ may receive from LLS $DU_0$ the terminal information regarding LLS UE connected to LLS $DU_0$, and may receive from HLS $DU_2$ the terminal information regarding HLS UE connected to HLS $DU_2$.

For example, on the basis of the terminal information regarding LLS UE, $RU_2$ may decode the DL control signal, notification of which is given by LLS $DU_0$ to LLS UE, to acquire the UL allocation information relating to LLS UE. Furthermore, for example, on the basis of the terminal information regarding HLS UE, $RU_2$ may decode the DL control signal, notification of which is given by HLS $DU_2$ to HLS UE, to acquire the UL allocation information relating to HLS UE.

Then, as in the first exemplary embodiment, $RU_2$ may, for example, control transfer of UL data to LLS $DU_0$ and HLS $DU_2$ on the basis of the UL allocation information.

For example, $RU_2$ may determine that the transmission source DU of the UL allocation information relating to LLS UE or HLS UE and indicating the resource to which the received UL data is allocated is the transfer destination DU of the received UL data. On the other hand, as in the first exemplary embodiment, for example, $RU_2$ does not need to transfer the UL data received in a resource that does not match the UL allocation information relating to either of LLS UE and HLS UE (in other words, $RU_2$ may determine that the UL data is not to be transferred).

For example, with reference to FIG. 11, $RU_2$ stores the terminal information regarding LLS UE connected to LLS $DU_0$ and the terminal information regarding HLS UE connected to HLS $DU_2$, decodes the DL control signals for these UEs, and stores the UL allocation information, as described above. On the other hand, for example, $RU_2$ does not need to hold the terminal information regarding HLS UE connected to HLS $DU_1$, or does not need to hold the UL allocation information relating to the HLS UE.

Therefore, with reference to FIG. 11, when, for example, $RU_2$ receives UL data sent from HLS UE connected to HLS $DU_1$ and $RU_2$ does not have the UL allocation information indicating a resource to which the UL data is allocated, $RU_2$ does not need to select the transfer destination DU of the UL data (in other words, $RU_2$ may determine that the UL data is not to be transferred). In other words, when, for example, $RU_2$ receives any UL data allocated to a resource different from the resource indicated in the UL allocation information, $RU_2$ may determine that the UL data has been sent from UE connected to another station (in other words, the UL data is a signal that may cause interference).

As described above, in the present exemplary embodiment, for example, RU 40 decodes a DL control signal, notification of which is given by DU 30 to UE, to acquire the UL allocation information for the UE. Then, on the basis of the UL allocation information, RU 40 controls transfer of the UL data to any one of a plurality of DUs 30 (for example, determines the transfer destination DU or determines whether to transfer the UL data).

This transfer control makes it unnecessary, for example, for DU 30 to give RU 40 notification of the control signal directed to RU 40, separately from the DL control signal including the UL allocation information given to UE. For example, the amount of the terminal information, notification of which is given by DU 30 to RU 40 (FIG. 14, for example) may be smaller than the amount of the UL allocation information (FIG. 10, for example), notification of which is given by DU 10 to RU 20 in an exemplary embodiment. In this case, the traffic volume between DU 30 and RU 40 (for example, the traffic volume in the fronthaul) can be reduced.

Furthermore, as in the first exemplary embodiment, in the present exemplary embodiment, RU 40 can correctly determine the transfer destination of UL data even when, for example, the resource allocation between LLS DU and HLS DU differs among clusters in the LLS configuration. Therefore, for example, UL data can be inhibited from being sent to a wrong destination in the fronthaul (FH), and thus the traffic in the fronthaul can be reduced to improve the transmission efficiency.

Third Exemplary Embodiment

In the present exemplary embodiment, description is given regarding a case where, for example, RU controls transfer of a UL signal (for example, a UL control signal or UL data) on the basis of the result of decoding the UL signal, in addition to performing operations based on the UL allocation information according to the first exemplary embodiment or the second exemplary embodiment.

Figure 15:
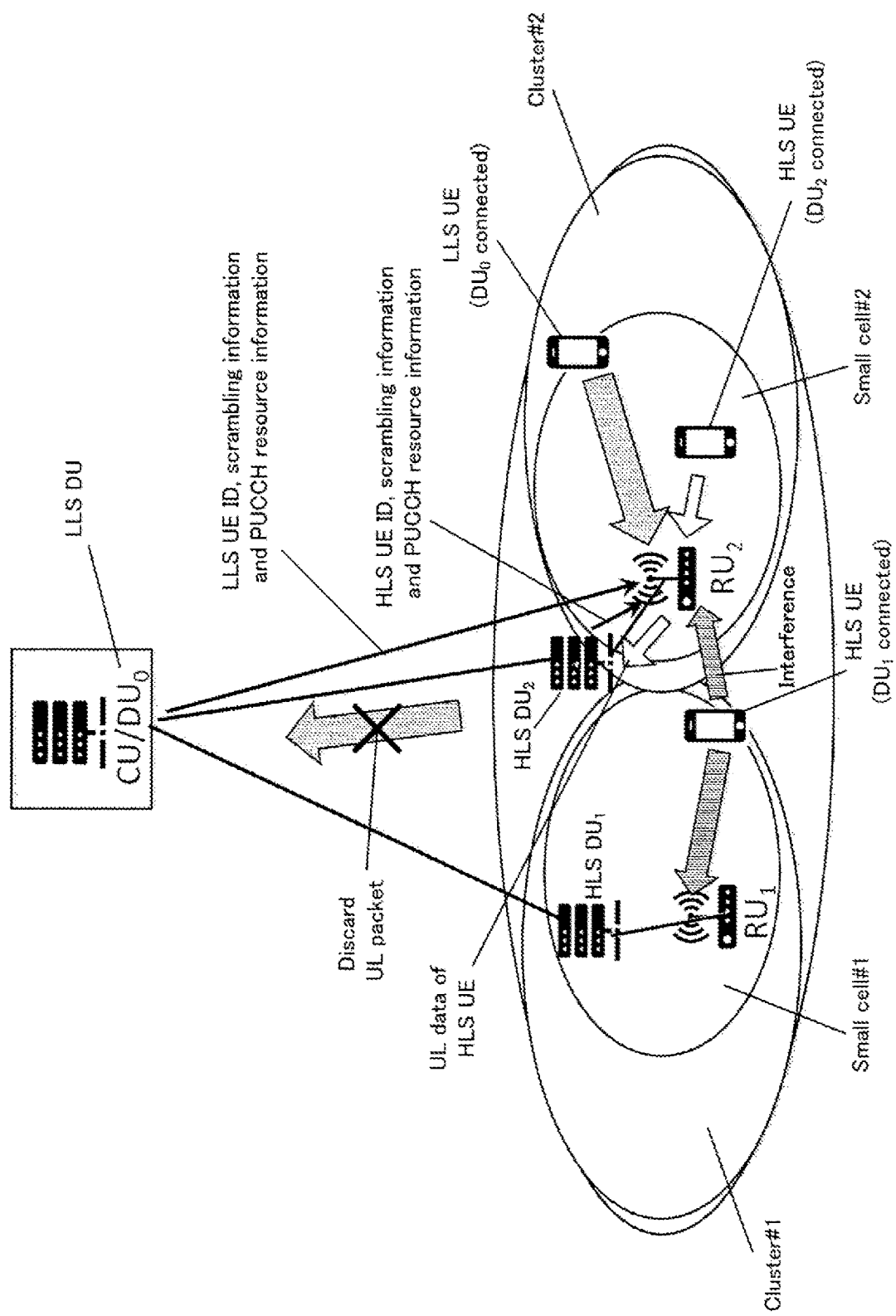
FIG. 15 is a diagram illustrating an example configuration of a wireless communication system according to a third exemplary embodiment.

FIG. 15 is a diagram illustrating an example configuration of a wireless communication system according to the present exemplary embodiment.

As in the first exemplary embodiment and the second exemplary embodiment, the wireless communication system according to the present exemplary embodiment includes, for example, at least a base station (for example, CU, DU, and RU) and a terminal (for example, UE).

The base station can be switched between an LLS configuration and an HLS configuration, for example. In FIG. 15, $DU_0$ is LLS DU and $DU_1$ and $DU_2$ are each HLS DU, for example. With reference to FIG. 15, $DU_0$ (Cluster #1, for example) and $DU_1$ share $RU_1$. With reference to FIG. 15, $DU_0$ (Cluster #2, for example) and $DU_2$ share $RU_2$.

For example, with reference to FIG. 15, individual RUs (for example, $RU_1$ and $RU_2$) may transfer UL data to LLS $DU_0$, the UL data being sent from the LLS UE connected to LLS $DU_0$. In addition, for example, with reference to FIG. 15, individual RUs (for example, each of $RU_1$ and $RU_2$) may transfer UL data to HLS DU, the UL data being sent from the HLS UE connected to the HLS DU (for example, $DU_1$ and $DU_2$). Note that an example of how RU determines the transfer destination DU of UL data will be described later.

Figure 16:
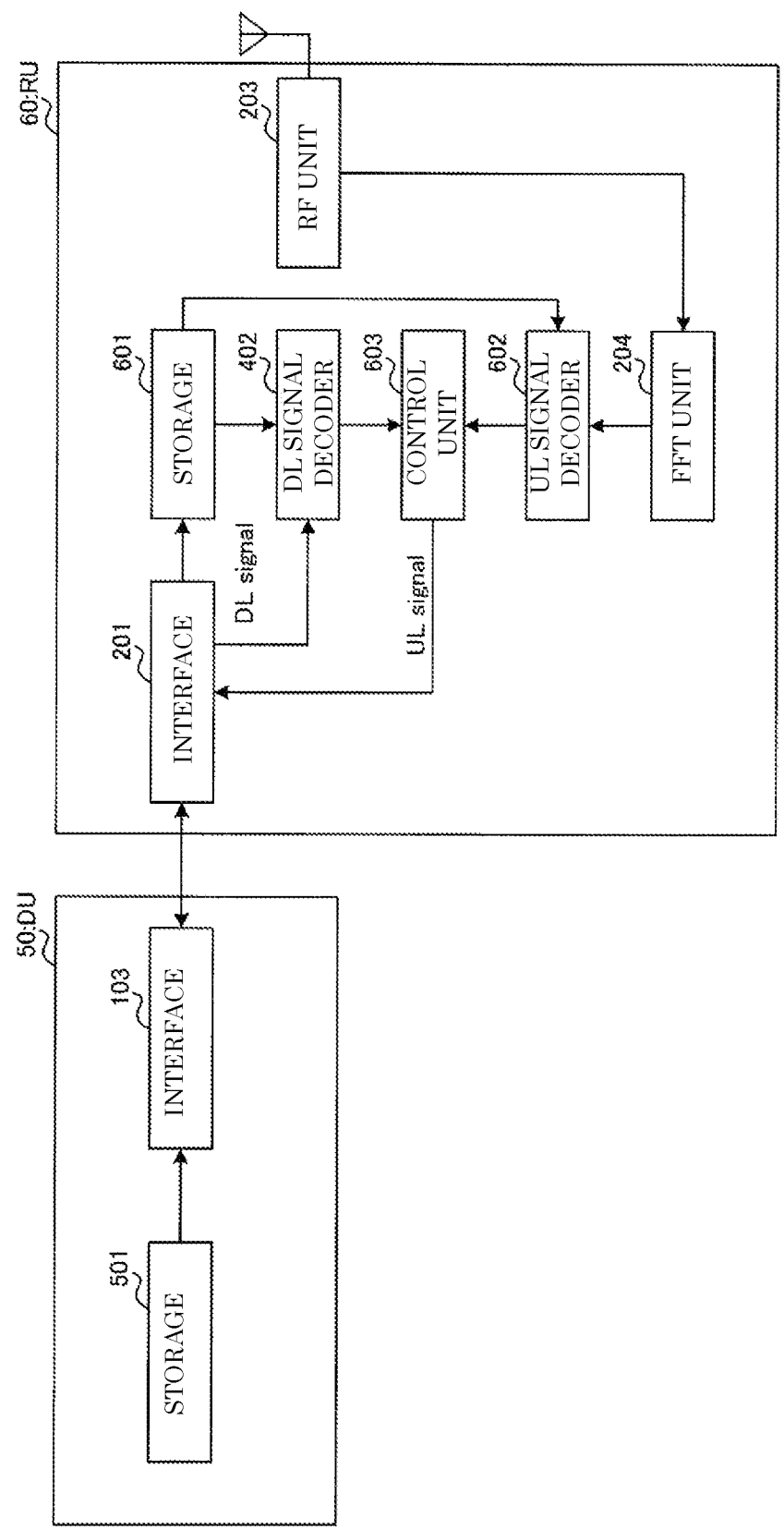
FIG. 16 is block diagram illustrating example configurations of DU and RU according to the third exemplary embodiment.

FIG. 16 is a block diagram illustrating example configurations of DU 50 and RU 60 according to the present exemplary embodiment. Note that components in FIG. 16 similar to those in the first exemplary embodiment (FIG. 8) or the second exemplary embodiment (FIG. 12) are given identical reference symbols and description of these components is omitted. For example, each of LLS $DU_0$, HLS $DU_1$, and HLS $DU_2$ illustrated in FIG. 15 may have the configuration of DU 50 shown in FIG. 16. Furthermore, for example, each of $RU_1$ and $RU_2$ illustrated in FIG. 15 may have the configuration of RU 60 shown in FIG. 16.

In DU 50 illustrated in FIG. 16, storage 501 may store, for example, information regarding the terminal (UE, for example) connected to DU 50 (hereinafter referred to as terminal information). The terminal information may include, for example, parameters used for decoding a DL control signal for a terminal (PDCCH, for example) such as identification information (UE ID or RNTI, for example) and scrambling information (Cell ID (PCI), for example).

Storage 501 may store, for example, the resource allocation information (PUCCH resource information, for example) indicating an allocated resource for a UL control signal (PUCCH, for example) sent by the terminal connected to DU 50. Note that notification of the resource allocation information for a UL control signal may be given by DU 50 to the terminal by, for example, higher layer signaling (for example, a Radio Resource Control (RRC) message or a higher layer parameter).

To storage 501, for example, the terminal information or the resource allocation information for a UL control signal may be input every time a terminal is connected (that is, attached) to DU 50.

DU 50 may send, for example, the terminal information including terminal identification information and scrambling information and the resource allocation information for a UL control signal to RU 60 via interface 103.

Storage 601 in RU 60 illustrated in FIG. 16 may store, for example, the terminal information and the resource allocation information for a UL control signal sent from DU 50 via interface 201.

UL signal decoder 602 may decode, on the basis of the terminal information stored in storage 601, the UL signal (for example, a UL control signal or UL data) input from FFT unit 204, and may output the decoded UL signal to control unit 603. In addition, UL signal decoder 602 may output, for example, information indicating the result of decoding the UL signal (for example, success or failure of decoding) to control unit 603.

For example, on the basis of the resource allocation information for a UL control signal as stored in storage 601, UL signal decoder 602 may identify the UL resource to which a UL control signal (for example, PUCCH) among UL signals output from FFT unit 204 is allocated. Then, when UL signal decoder 602 receives the UL control signal in the identified UL resource, UL signal decoder 602 may decode the UL control signal by using the terminal information stored in storage 601.

Control unit 603 may control, for example, transfer of UL signals to a plurality of DUs 50, on the basis of the information indicting the result of decoding the UL signal as input from UL signal decoder 602 and of the UL allocation information for a terminal as input from DL signal decoder 402. For example, if the result of decoding the UL signal is success, control unit 603 may determine the DU (LLS DU or HLS DU) to which the received UL signal is to be transferred, on the basis of the UL control signal. On the other hand, for example, if the result of decoding the UL signal is failure, control unit 603 may determine that the received UL signal is not to be transferred. Control unit 603 may, for example, output information regarding the determined transfer destination DU to interface 201. Note that an example of how RU 60 (control unit 603, for example) determines the transfer destination DU of a UL signal will be described later.

[Example Operations of DU 50 and RU 60]

The following describes example operations of above-described DU 50 and RU 60.

Figure 17:
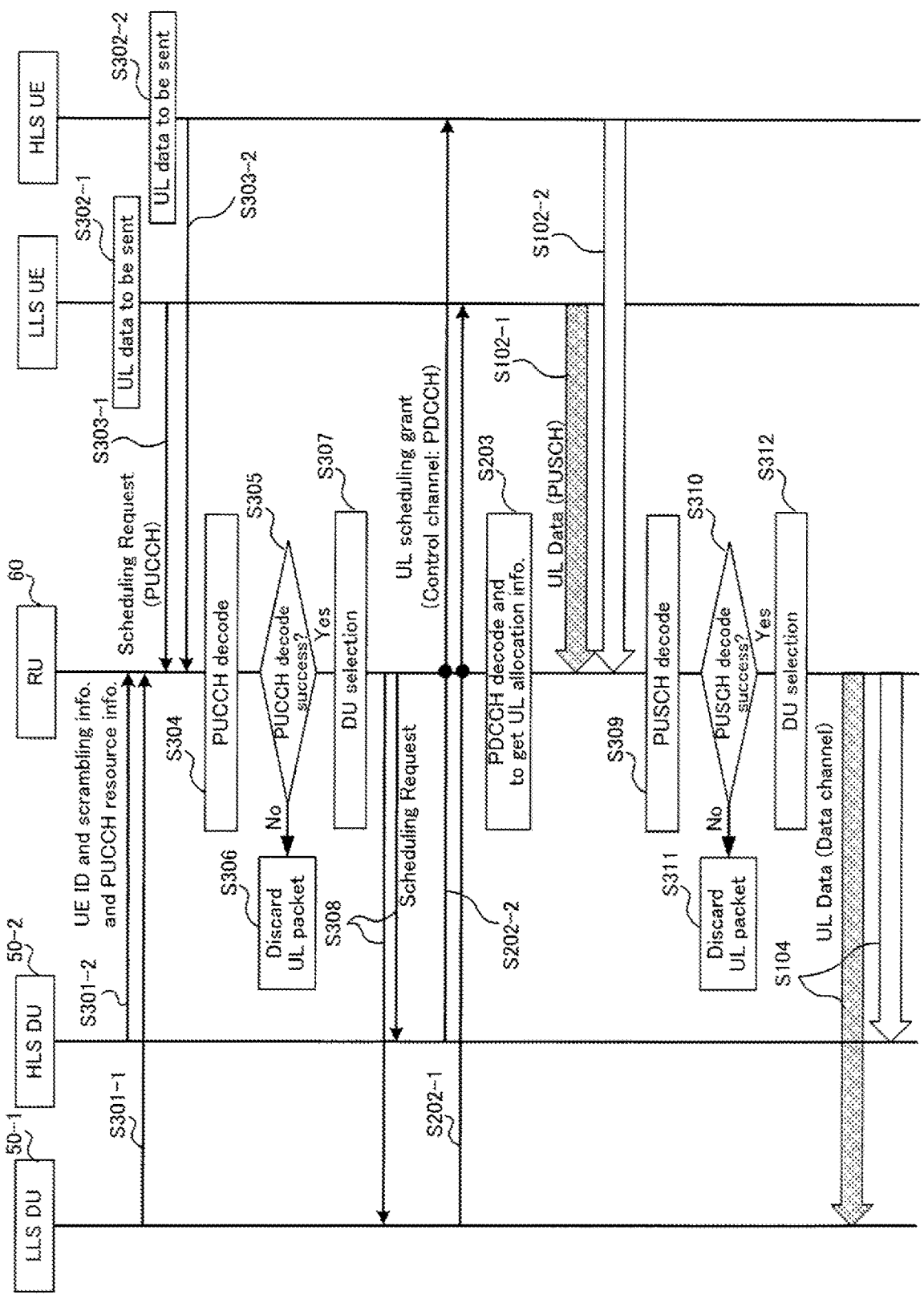
FIG. 17 is a sequence diagram illustrating an example of UL signal transmission according to the third exemplary embodiment.

FIG. 17 is a sequence diagram illustrating example operations of DU 50 and RU 60 for UL signal transmission. Note that operations in FIG. 17 similar to those in the first exemplary embodiment (FIG. 9, for example) or the second exemplary embodiment (FIG. 13, for example) are given identical reference symbols and description of these operations is omitted.

As an example, FIG. 17 illustrates a case in which the UL control signal is a Scheduling Request (SR). SR is, for example, a message requesting for allocation of a UL resource, the message being sent by a terminal by using a UL control channel (PUCCH, for example) when UL data to be sent is generated in the terminal.

With reference to FIG. 17, for example, LLS DU and HLS DU each may have the configuration of DU 50 shown in FIG. 16 (denoted as DU 50-1 and DU 50-2, for example), and RU may have the configuration of RU 60 shown in FIG. 16.

For example, LLS DU may send, to RU 60 corresponding to the LLS DU, the terminal information (for example, UE ID and scrambling information) and the resource allocation information for a UL control signal (for example, PUCCH resource information) regarding the terminal (LLS UE) connected to the LLS DU (S301-1). HLS DU may send, to RU 60 corresponding to the HLS DU, the terminal information and the resource allocation information for a UL control signal regarding the terminal (HLS UE) connected to the HLS DU (S301-2). For example, RU 60 may store the terminal information and the resource allocation information for a UL control signal received from each of LLS DU and HLS DU.

Notification of the terminal information and the resource allocation information for a UL control signal may be given at a timing when, for example, the terminal is connected (that is, attached) to DU 50, or at another timing. In addition, notification of the terminal information and the resource allocation information for a UL control signal may be given individually to RU 60, or may be collectively given to RU 60.

Furthermore, for example, notification of the resource allocation information for a UL control signal may be given by DU 50 to UE by, for example, an RRC message (not shown).

The terminal information held by RU 60 may be, for example, the same as in the second exemplary embodiment (FIG. 14).

FIG. 18 is a diagram showing an example of the resource allocation information for a UL control signal (PUCCH resource information) held by RU 60. For example, FIG. 18 shows the resource allocation information for a UL control signal relating to UE connected to LLS DU, as notified by LLS DU, and the resource allocation information for a UL control signal relating to UE connected to HLS DU, as notified by HLS DU.

The resource allocation information for a UL control signal may include, for example, the following parameters.
  A value for identifying DU (DU index, for example)
  Terminal identification information (UE ID or RNTI, for example)
  Format of UL control signal (PUCCH format, for example)
  A start number (Start RB index or PRB-id, for example) of the frequency resource (RB, for example) to which a UL control signal is allocated
  The number of consecutive frequency resources (Number of Consecutive RBs, for example) to which a UL control signal is allocated
  A value for identifying the subframe to which a UL control signal is allocated (Subframe index, for example)
  A value for identifying the slot to which a UL control signal is allocated (Slot index, for example)
  A start number of the symbol to which a UL control signal is allocated (Start Symbol index, for example)
  The number of consecutive symbols to which a UL control signal is allocated (Number of Consecutive symbols, for example)

Note that parameters included in the resource allocation information for a UL control signal are not limited to the above-mentioned parameters, but may include other parameters relating to resources for a UL control signal. For example, the UL allocation information may not necessarily include a value for identifying UE (UE ID or RNTI, for example) among the parameters shown in FIG. 18.

In addition, notification of the resource allocation information for a UL control signal shown in FIG. 18 may be given individually to RU 60 for each target UE of allocation (for example, on the basis of UE ID) or for each PUCCH format, or may be collectively given to RU 60 for a plurality of UEs or PUCCH formats. For example, every time UE is connected (that is, attached) to DU 50, DU 50 may notify RU 60 of the terminal information regarding the UE or the resource allocation information for a UL control signal. Furthermore, DU 50 (LLS DU or HLS DU, for example) may notify RU 60 of each of the plurality of parameters included in the resource allocation information for a UL control signal shown in FIG. 18, or of at least two parameters together at a time. For example, DU 50 may notify RU 60 of each of the parameters included in the resource allocation information shown in FIG. 18 every time the parameter is up dated.

With reference to FIG. 17, the following describes operations related to transmission of a UL control signal (PUCCH, for example).

For example, when UL data to be sent is generated (S302-1), LLS UE sends Scheduling Request (SR) for the UL data to RU 60 on the basis of the resource allocation information (not illustrated) as notified by LLS DU (S303-1). Likewise, when, for example, UL data to be sent is generated (S302-2), HLS UE sends Scheduling Request (SR) for the UL data to RU 60 on the basis of the resource allocation information (not illustrated) as notified by HLS DU (S303-2).

RU 60 decodes PUCCH (SR in this example) on the basis of, for example, the terminal information and the resource allocation information for a UL control signal as notified by DU 50 (for example, LLS DU and HLS DU) (S304).

In addition, for example, RU 60 determines whether decoding of PUCCH has been successful (S305). If decoding of PUCCH has been unsuccessful (S305: No), RU 60 may, for example, discard the UL packet (SR, for example) (S306). In other words, if RU 60 has failed in decoding PUCCH, RU 60 may determine that PUCCH is not to be transferred. On the other hand, if decoding of PUCCH has been successful (S305: Yes), RU 60 may determine (that is, select), for example, the transmission source DU 50 of the PUCCH resource information from among a plurality of DUs 50 as the transfer destination DU of PUCCH (SR, for example) (S307). Then, RU 60 may, for example, send SR to the determined transfer destination DU (S308).

With reference to FIG. 17, the following describes operations related to transmission of UL data (PUSCH, for example).

With reference to FIG. 17, RU 60 decodes UL data (PUSCH, for example) on the basis of, for example, the terminal information notified by DU 50 (S309).

In addition, for example, RU 60 determines whether decoding of PUSCH has been successful (S310). If decoding of PUSCH has been unsuccessful (S310: No), RU 60 may, for example, discard the UL packet (PUSCH, for example) (S311). In other words, if RU 60 has failed in decoding PUSCH, RU 60 may determine that PUSCH is not to be transferred. On the other hand, if decoding of PUSCH has been successful (S310: Yes), RU 60 may, for example, determine (that is, select) the transfer destination DU of PUSCH on the basis of the acquired UL allocation information, as in the second exemplary embodiment (S312).

As described above, among UL signals sent from a terminal (for example, UL control signals or UL data), RU 60 transfers the UL signal that has been successfully decoded to DU, but does not transfer the UL signal that has not been successfully decoded (for example, the UL signal is discarded).

It may be anticipated here that, for example, the communication environment (in other words, the communication quality) of RU 60 is degraded in a case where RU 60 fails in decoding a UL signal. For example, assuming that RU 60 has failed in decoding a UL signal and RU 60 transfers the UL signal to DU 50, DU 50 may be less likely to successfully decode the UL signal because of interference of cells around the cell (for example, a small cell) corresponding to RU 60. Therefore, since RU 60 refrains from transferring the UL signals that DU 50 is highly likely to unsuccessfully decode, the traffic volume in the radio link (fronthaul, for example) between DU 50 and RU 60 can be reduced to improve the transmission efficiency.

Note that, in the present exemplary embodiment, description is given regarding a case where transfer control is performed on the basis of whether RU has successfully decoded a UL signal, in addition to operations in the second exemplary embodiment (for example, RU decodes PDCCH to acquire UL allocation information); however, this is not restrictive. For example, transfer control may be performed on the basis of whether RU has successfully decoded a UL signal, in addition to operations in the first exemplary embodiment (for example, notification of UL allocation information is given to RU).

In addition, in the present exemplary embodiment, description is given regarding a case where a Scheduling Request (SR) is used as an example of UL control signals; however, UL control signals are not limited to SRs. For example, UL control signals may include at least one information item such as SR, a response signal (for example, ACK/NACK or hybrid automatic repeat request (also called HARQ-ACK)), or Channel State Information (CSI).

In the description given as an example with reference to FIG. 17, RU 60 performs both the transfer control for a UL control signal and the transfer control for UL data; however, this is not restrictive. RU 60 may perform at least one of the transfer control for a UL control signal and the transfer control for UL data. For example, in the case where RU 60 performs the transfer control for UL data but does not perform the transfer control for a UL control signal, notification of the resource allocation information for a UL control signal may not necessarily be given by DU 50 to RU 60.

In addition, in the description given with reference to FIG. 17, RU 60 performs the transfer control based on whether a UL signal (PUCCH or PUSCH, for example) has been successfully decoded, and then performs the transfer control based on the UL allocation information; however, this is not restrictive. For example, RU 60 may perform the transfer control based on the UL allocation information, and then perform the transfer control based on whether a UL signal has been successfully decoded. Alternatively, RU 60 may perform the transfer control based on whether a UL signal has been successfully decoded and the transfer control based on the UL allocation information in parallel. For example, with reference to FIG. 17, before the transfer control based on whether a UL signal has been successfully decoded (for example, the process in S304 or S309), RU 60 may perform the transfer control based on the UL allocation information (for example, a process like S307 or S312). Then, for example, RU 60 may discard any UL data received in the resource that does not match the UL allocation information relating to each of LLS UE and HLS UE, and may perform, on the UL data received in the matching resource, the transfer control based on whether a UL signal has been successfully decoded (for example, the processes starting from S304 or S309).

In the present exemplary embodiment, description is given regarding the case where RU 60 determines, for example, that the received UL signal is not to be transferred (for example, that the UL signal is to be discarded) when RU 60 fails in decoding the UL signal; however, this is not restrictive. For example, RU 60 may transfer the received UL signal to DU 50 when the traffic volume in the fronthaul is less than or equal to a threshold and the UL signal has not been decoded successfully. As a result of the transfer, DU 50 may perform, for example, retransmission combination using the UL signal that has not been decoded successfully.

Individual exemplary embodiments of the present disclosure have been described above.

Note that functional modules separated into CU, DU, and CU constituting a base station is not limited to the distribution (in other words, split points) illustrated in the example in FIG. 1 but may be distributed in other ways. For example, instead of the distribution in FIG. 1, DU may include a Radio Link Control (RLC) function and a MAC function, and RU may include a High-PHY function, a Low-PHY function, and an RF function.

The downlink control channel, the uplink control channel, and the uplink data channel are not limited to PDCCH, PUCCH, and PUSCH, respectively, but may be control channels having other names.

In the above-described exemplary embodiments, units of time resources are not limited to subframes, slots, and symbols but may be any other time resource units. In the above-described exemplary embodiments, units of frequency resources are not limited to BWP, RB, or PRB but may be any other frequency resource units.

The present disclosure can be implemented by software, hardware, or software in collaboration with hardware. Each of the functional blocks used in the description of the above exemplary embodiments may be implemented, in whole or in part, in the form of an LSI, which is an integrated circuit, and each of the processes described in the above exemplary embodiment may be controlled, in whole or in part, by a single LSI or a combination of LSIs. The LSI may be formed of individual chips or may be formed of a single chip so as to include some or all of the functional blocks. The LSI may include a data input and a data output. The LSI may also be referred to as an IC, a system LSI, a super LSI, or an ultra LSI in accordance with the level of integration.

The circuit integration technique is not limited to LSI, and the circuit integration may be achieved by dedicated circuitry, a general-purpose processor, or a dedicated processor. Alternatively, a Field Programmable Gate Array (FPGA), which is programmable after fabrication of the LSI, or a reconfigurable processor that allows reconfiguration of connections and settings of circuit cells in LSI may be used. The present disclosure may be implemented as digital processing or analog processing.

Moreover, if a circuit integration technology replacing LSI emerges as a result of advancements in semiconductor technology or other technologies derived therefrom, as a matter of course, the functional blocks may be integrated by using such technology. A possibility is the application of biotechnology, for example.

Terminals (UE) that communicate with the base station in the present disclosure include apparatuses, devices, and systems of any type having a communication function (collectively referred to as a communication apparatus). The communication apparatus may include a wireless transmitter/receiver (transceiver) and a processing/control circuit. The wireless transceiver may include a receiver and a transmitter, or may include both as functions. The wireless transceiver (transmitter and receiver) may include a radio frequency (RF) module and one or more antennas. The RF module may include an amplifier, an RF modulator/demodulator, or the like. Non-limiting examples of the communication apparatus include a telephone (such as a mobile phone or smart phone), a tablet, a personal computer (PC) (such as a laptop, desktop, or notebook computer), a camera (such as a digital still or video camera), a digital player (such as a digital audio or video player), a wearable device (such as a wearable camera, smart watch, or tracking device), a game console, a digital book reader, a telehealth telemedicine (such as remote healthcare or medicine prescription) device, a vehicle with communication functions or mobile transportation facility (such as a car, airplane, or ship), and a combination of the above-mentioned various devices.

Communication apparatuses are not limited to portable or mobile apparatuses but include any type of apparatuses, devices, and systems that are not portable or are fixed, including, for example, a smart home device (such as a home electrical appliance, lighting equipment, smart meter or measuring instrument, or control panel), a vending machine, and any other "things" that can reside on an Internet of Things (IoT) network.

Communications include not only data communications based on a cellular system, a wireless LAN system, a communication satellite system, or the like but also data communications based on a combination thereof.

Communication apparatuses also include a controller, a sensor, and any other device that are connected or coupled to the communication device that performs the communication functions described in the present disclosure. For example, communication apparatuses include controllers and sensors that generate control signals and data signals to be used by the communication device that performs communication functions of the communication apparatus.

Furthermore, the present disclosure includes the infrastructure equipment that communicates with the above-mentioned non-limiting various apparatuses or controls these various apparatuses, the infrastructure equipment including, for example, base stations, access points, and any other apparatuses, devices, and systems.

A radio unit according to an exemplary embodiment of the present disclosure includes: receiver circuitry which, in operation, receives, from each of a first distributed unit and a second distributed unit that control the radio unit, control information regarding resource allocation for uplink for a terminal; and controller circuitry which, in operation, controls, based on the control information, transfer of a received signal in the uplink to either the first distributed unit or the second distributed unit.

In an exemplary embodiment of the present disclosure, the control information includes resource allocation information for the uplink.

In an exemplary embodiment of the present disclosure, the controller circuitry determines, as a destination to which the received signal is to be transferred, one of the first distributed unit or the second distributed unit that has sent the resource allocation information corresponding to a resource of the received signal.

In an exemplary embodiment of the present disclosure, the controller circuitry determines that the received signal that is received in a resource that does not match with the resource allocation information is not to be transferred.

In an exemplary embodiment of the present disclosure, resource allocation information for the uplink is included in a downlink control signal for the terminal, and the control information includes a parameter used for decoding the downlink control signal.

In an exemplary embodiment of the present disclosure, the controller circuitry decodes the downlink control signal using the parameter to acquire the resource allocation information, and the controller circuitry determines, as a destination to which the received signal is to be transferred, one of the first distributed unit or the second distributed unit that has sent the resource allocation information corresponding to a resource of the received signal.

In an exemplary embodiment of the present disclosure, the controller circuitry decodes the downlink control signal using the parameter to acquire the resource allocation information, and the controller circuitry determines that the received signal that is received in a resource that does not match with the resource allocation information is not to be transferred.

In an exemplary embodiment of the present disclosure, the controller circuitry determines, when decoding of the received signal is successful, the distributed unit to which the received signal is to be transferred, and the controller circuitry determines, when decoding of the received signal is unsuccessful, that the received signal is not to be transferred.

In an exemplary embodiment of the present disclosure, the control information includes resource allocation information for an uplink control signal, and the controller circuitry determines, when decoding of the uplink control signal received based on the resource allocation information for the uplink control signal is successful, as a destination to which the uplink control signal is to be transferred, one of the first distributed unit or the second distributed unit that has sent the resource allocation information corresponding to a resource of the uplink control signal.

In an exemplary embodiment of the present disclosure, resource allocation information for uplink data is included in a downlink control signal for the terminal, the control information includes a parameter used for decoding the downlink control signal, the controller circuitry decodes the downlink control signal using the parameter to acquire the resource allocation information for the uplink data, and the controller circuitry determines, when decoding of the uplink data received based on the resource allocation information for the uplink data is successful, as a destination to which the uplink data is to be transferred, one of the first distributed unit or the second distributed unit that has sent the resource allocation information corresponding to a resource of the uplink data.

A distributed unit according to an exemplary embodiment of the present disclosure includes: transmitter circuitry which, in operation, transmits control information regarding resource allocation for uplink for a terminal to a radio unit; and receiver circuitry which, in operation, receives a signal in the uplink, the signal being sent by the radio unit based on the control information.

A communication method according to an exemplary embodiment of the present disclosure is performed by a radio unit and includes: receiving, from each of a first distributed unit and a second distributed unit that control the radio unit, control information regarding resource allocation for uplink for a terminal; and controlling, based on the control information, transfer of a received signal in the uplink to either the first distributed unit or the second distributed unit.

A communication method according to an exemplary embodiment of the present disclosure is performed by a distributed unit and includes: transmitting control information regarding resource allocation for uplink for a terminal to a radio unit; and receiving a signal in the uplink, the signal being sent by the radio unit based on the control information.

An exemplary embodiment of the present disclosure is useful for wireless communication systems.

What is claimed is:

1. A radio unit comprising:
   receiver circuitry configured to receive, from each of a first distributed unit and a second distributed unit that control the radio unit, control information regarding resource allocation for uplink for a terminal;
   decoder circuitry configured to decode, decodes a received signal; and
   controller circuitry configured to control, based on the control information, (i) transfer of the received signal to either the first distributed unit or the second distributed unit and (ii) non-transfer of the received signal, the received signal being a signal received from the terminal via the uplink,
   wherein the controller circuitry is further configured to determine, when decoding of the received signal is successful, the distributed unit to which the received signal is to be transferred, and the controller circuitry is further configured to determine, when decoding of the received signal is unsuccessful, that the received signal is not to be transferred,
   wherein the control information includes resource allocation information for the uplink,
   the resource allocation information for the uplink is included in a downlink control signal for the terminal, and
   the control information includes a parameter used for decoding the downlink control signal.

2. The radio unit according to claim 1, wherein the control information includes resource allocation information for the uplink.

3. The radio unit according to claim 2, wherein the controller circuitry is further configured to determine, as a destination to which the received signal is to be transferred, one of the first distributed unit or the second distributed unit that has sent the resource allocation information corresponding to a resource of the received signal.

4. The radio unit according to claim 2, wherein the controller circuitry is further configured to determine that the received signal that is received in a resource does not match the resource allocation information and is not to be transferred.

5. The radio unit according to claim 1, wherein
   the controller circuitry is further configured to decode the downlink control signal using the parameter to acquire the resource allocation information, and
   the controller circuitry is further configured to determine, as a destination to which the received signal is to be transferred, one of the first distributed unit or the second distributed unit that has sent the resource allocation information corresponding to a resource of the received signal.

6. The radio unit according to claim 1, wherein
   the controller circuitry is further configured to decode the downlink control signal using the parameter to acquire the resource allocation information, and
   the controller circuitry is further configured to determine that the received signal is received in a resource that does not match the resource allocation information and is not to be transferred.

7. The radio unit according to claim 1, wherein
   the received signal includes uplink data, and an uplink control signal,
   the control information includes resource allocation information for the uplink control signal, and
   the controller circuitry is further configured to determine, when decoding of the uplink control signal received based on the resource allocation information for the uplink control signal is successful, as a destination to which the uplink control signal is to be transferred, one of the first distributed unit or the second distributed unit that has sent the resource allocation information corresponding to a resource of the uplink control signal.

8. The radio unit according to claim 1, wherein
the received signal includes uplink data, and an uplink control signal,
the control information includes resource allocation information for the uplink data,
the resource allocation information for the uplink data is included in a downlink control signal for the terminal,
the control information includes a parameter used for decoding the downlink control signal,
the controller circuitry is further configured to decode the downlink control signal using the parameter to acquire the resource allocation information for the uplink data, and
the controller circuitry is further configured to determine, when decoding of the uplink data received based on the resource allocation information for the uplink data is successful, as a destination to which the uplink data is to be transferred, one of the first distributed unit or the second distributed unit that has sent the resource allocation information corresponding to a resource of the uplink data.

9. A communication method performed by a radio unit, the communication method comprising:
receiving, from each of a first distributed unit and a second distributed unit that control the radio unit, control information regarding resource allocation for uplink for a terminal;
decoding a received signal; and
controlling, based on the control information, (i) transfer of the received signal to either the first distributed unit or the second distributed unit or (ii) non-transfer of the received signal, the received signal being a signal received from the terminal via the uplink,
wherein the controlling includes: determining, when decoding of the received signal is successful, the distributed unit to which the received signal is to be transferred; or
determining, when decoding of the received signal is unsuccessful, that the received signal is not to be transferred,
wherein the control information includes resource allocation information for the uplink,
the resource allocation information for the uplink is included in a downlink control signal for the terminal, and
the control information includes a parameter used for decoding the downlink control signal.

\* \* \* \* \*